US012675083B2

(12) United States Patent
Mentovich et al.

(10) Patent No.: US 12,675,083 B2
(45) Date of Patent: Jul. 7, 2026

(54) MANUFACTURING MULTI-COMPONENT OBJECTS USING ARTIFICIAL INTELLIGENCE

(71) Applicant: NVIDIA CORPORATION, Santa Clara, CA (US)

(72) Inventors: Elad Mentovich, Tel Aviv (IL); Siddha Ganju, Santa Clara, CA (US); Jeff Whitmer, San Jose, CA (US); Ryan Albright, Beaverton, OR (US); Tahir Cader, Spokane Valley, WA (US); Ron Chao, San Diego, CA (US)

(73) Assignee: Nvidia Corporation, Santa Clara, CA (US)

( * ) Notice: Subject to any disclaimer, the term of this patent is extended or adjusted under 35 U.S.C. 154(b) by 324 days.

(21) Appl. No.: 18/237,233

(22) Filed: Aug. 23, 2023

(65) Prior Publication Data

US 2025/0068132 A1     Feb. 27, 2025

(51) Int. Cl.
G05B 13/02          (2006.01)
G06F 1/20           (2006.01)

(52) U.S. Cl.
CPC ......... G05B 13/0265 (2013.01); G06F 1/206 (2013.01)

(58) Field of Classification Search
CPC ........................................... G05B 2219/32007
See application file for complete search history.

(56) References Cited

U.S. PATENT DOCUMENTS

| | | | | |
|---|---|---|---|---|
| 2011/0302776 A1* | 12/2011 | Kato | .................... | H05K 13/085 |
| | | | | 29/829 |
| 2015/0264810 A1* | 9/2015 | Baba | .................... | H05K 3/4046 |
| | | | | 174/265 |
| 2016/0049741 A1* | 2/2016 | Cassin | ................... | H01R 12/52 |
| | | | | 29/830 |

(Continued)

FOREIGN PATENT DOCUMENTS

| | | | | | |
|---|---|---|---|---|---|
| CN | 1979503 | A | * | 6/2007 | |
| CN | 116091416 | A | * | 5/2023 | ........... G06T 7/0004 |

(Continued)

OTHER PUBLICATIONS

Chao et al., Pending U.S. Appl. No. 18/113,217, filed Feb. 23, 2023.

(Continued)

*Primary Examiner* — Suresh Suryawanshi
(74) *Attorney, Agent, or Firm* — Alston & Bird LLP

(57)          ABSTRACT

Methods are described herein for manufacturing multi-component objects using artificial intelligence. The present invention may be directed to a method that includes determining an actual value of a first attribute of a first component of an object and determining, using a machine learning model and based on the actual value of the first attribute, an optimized value for a second attribute of a second component that is functionally interrelated to the first component in the object. The method may include selecting, from a plurality of second components each having a value for the second attribute within a tolerance range, a second component having the optimized value for the second attribute. The (Continued)

500 ⌐⌐

DETERMINE AN ACTUAL VALUE OF A FIRST ATTRIBUTE OF A FIRST COMPONENT OF AN OBJECT
502

DETERMINE, USING A MACHINE LEARNING MODEL AND BASED ON THE ACTUAL VALUE OF THE FIRST ATTRIBUTE, AN OPTIMIZED VALUE FOR A SECOND ATTRIBUTE OF A SECOND COMPONENT THAT IS FUNCTIONALLY INTERRELATED TO THE FIRST COMPONENT IN THE OBJECT
504

SELECT, FROM A PLURALITY OF SECOND COMPONENTS EACH HAVING A VALUE FOR THE SECOND ATTRIBUTE WITHIN A TOLERANCE RANGE, THE SECOND COMPONENT HAVING THE OPTIMIZED VALUE FOR THE SECOND ATTRIBUTE
506

MANUFACTURE THE OBJECT USING THE FIRST COMPONENT AND THE SELECTED SECOND COMPONENT
508 method may further include manufacturing the object using the first component and the selected second component.

18 Claims, 12 Drawing Sheets

(56)                    References Cited

U.S. PATENT DOCUMENTS

| 2021/0086363 | A1* | 3/2021 | Stertkamp | G05B 19/41805 |
| 2023/0052423 | A1* | 2/2023 | Vijayan | G06Q 30/016 |
| 2023/0097885 | A1* | 3/2023 | Reynolds | G05B 13/042 |
| | | | | 700/29 |
| 2023/0237635 | A1 | 7/2023 | Ganju et al. | |

FOREIGN PATENT DOCUMENTS

| JP | 2002232186 A | * | 8/2002 |
| JP | 2004078818 A | * | 3/2004 |

OTHER PUBLICATIONS

Ganju et al., Pending U.S. Appl. No. 18/215,290, filed Jun. 28, 2023.

* cited by examiner

200

202

204

206

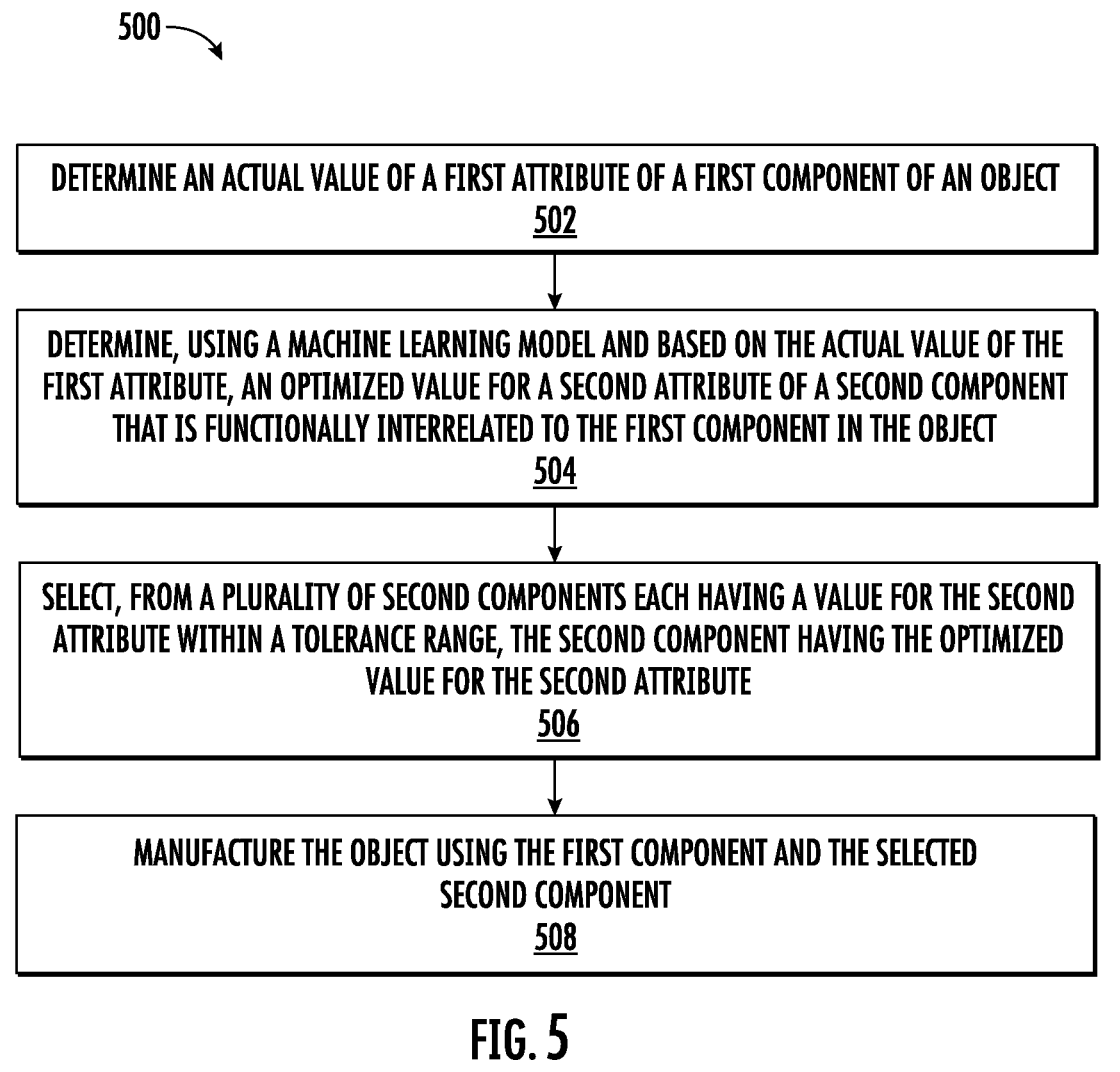

500 ⬎

```
┌──────────────────────────────────────────────────────────────────────┐
│   DETERMINE AN ACTUAL VALUE OF A FIRST ATTRIBUTE OF A FIRST COMPONENT   │
│                          OF AN OBJECT                                  │
│                             502                                        │
└──────────────────────────────────────────────────────────────────────┘
                              │
                              ▼
┌──────────────────────────────────────────────────────────────────────┐
│   DETERMINE, USING A MACHINE LEARNING MODEL AND BASED ON THE ACTUAL     │
│   VALUE OF THE FIRST ATTRIBUTE, AN OPTIMIZED VALUE FOR A SECOND         │
│   ATTRIBUTE OF A SECOND COMPONENT THAT IS FUNCTIONALLY INTERRELATED     │
│            TO THE FIRST COMPONENT IN THE OBJECT                         │
│                             504                                        │
└──────────────────────────────────────────────────────────────────────┘
                              │
                              ▼
┌──────────────────────────────────────────────────────────────────────┐
│   SELECT, FROM A PLURALITY OF SECOND COMPONENTS EACH HAVING A VALUE     │
│   FOR THE SECOND ATTRIBUTE WITHIN A TOLERANCE RANGE, THE SECOND         │
│        COMPONENT HAVING THE OPTIMIZED VALUE FOR THE SECOND ATTRIBUTE    │
│                             506                                        │
└──────────────────────────────────────────────────────────────────────┘
                              │
                              ▼
┌──────────────────────────────────────────────────────────────────────┐
│   MANUFACTURE THE OBJECT USING THE FIRST COMPONENT AND THE SELECTED     │
│                        SECOND COMPONENT                                │
│                             508                                        │
└──────────────────────────────────────────────────────────────────────┘
```

FIG. 5

800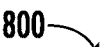

DETERMINE A FIRST ACTUAL VALUE OF A FIRST ATTRIBUTE OF A FIRST COMPONENT OF AN OBJECT
802

DETERMINE A SECOND ACTUAL VALUE OF A SECOND ATTRIBUTE OF A SECOND COMPONENT OF THE OBJECT
804

DETERMINE, USING A MACHINE LEARNING MODEL AND BASED ON THE FIRST ACTUAL VALUE OF THE FIRST ATTRIBUTE AND THE SECOND ACTUAL VALUE OF THE SECOND ATTRIBUTE, AN OPTIMIZED VALUE FOR A THIRD ATTRIBUTE OF A THIRD COMPONENT THAT IS FUNCTIONALLY INTERRELATED TO THE FIRST COMPONENT AND THE SECOND COMPONENT OF THE OBJECT
806

SELECT, FROM A PLURALITY OF THIRD COMPONENTS EACH HAVING A VALUE FOR THE THIRD ATTRIBUTE WITHIN A TOLERANCE RANGE, THE THIRD COMPONENT HAVING THE OPTIMIZED VALUE FOR THE THIRD ATTRIBUTE
808

MANUFACTURE THE OBJECT USING THE FIRST COMPONENT, THE SECOND COMPONENT, AND THE SELECTED THIRD COMPONENT
810

FIG. 8

1000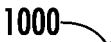

┌─────────────────────────────────────────────────────────────────────┐
│ PERFORM A RESPECTIVE STEP IN A SERIES OF STEPS FOR MANUFACTURING AN OBJECT TO │
│ ACHIEVE A TARGET OUTCOME OF THE RESPECTIVE STEP │
│ 1002 │
└─────────────────────────────────────────────────────────────────────┘

┌─────────────────────────────────────────────────────────────────────┐
│ AFTER PERFORMING THE RESPECTIVE STEP, CAPTURE ONE OR MORE IMAGES OF AN ACTUAL │
│ OUTCOME OF THE RESPECTIVE STEP │
│ 1004 │
└─────────────────────────────────────────────────────────────────────┘

┌─────────────────────────────────────────────────────────────────────┐
│ PROVIDE THE ONE OR MORE IMAGES TO ONE OR MORE MACHINE LEARNING MODELS TO │
│ DETERMINE WHETHER THE ACTUAL OUTCOME OF THE RESPECTIVE STEP CORRESPONDS │
│ TO THE TARGET OUTCOME OF THE RESPECTIVE STEP │
│ 1006 │
└─────────────────────────────────────────────────────────────────────┘

DOES THE ACTUAL OUTCOME OF
THE RESPECTIVE STEP CORRESPOND TO THE TARGET OUTCOME
OF THE RESPECTIVE STEP?
1008

NO                                                          YES

┌──────────────────────────┐          ┌──────────────────────────┐
│ STOP PERFORMANCE OF THE │          │ INITIATE PERFORMANCE OF │
│ SERIES OF STEPS AND │          │ A SUBSEQUENT STEP IN │
│ GENERATE A NOTIFICATION │          │ THE SERIES OF STEPS │
│ 1010 │          │ 1012 │
└──────────────────────────┘          └──────────────────────────┘

FIG. 10

MANUFACTURING MULTI-COMPONENT OBJECTS USING ARTIFICIAL INTELLIGENCE

FIELD OF THE INVENTION

The present invention relates to methods for manufacturing multi-component objects using artificial intelligence.

BACKGROUND

A manufacturing process for an object may include assembling the object from a plurality of components. Each component may be manufactured to one or more specifications within manufacturing tolerances. For example, an electronic device may include a circuit board and one or more pins to be received within holes in the circuit board via an interference fit. In such an example, the pins may be manufactured to have a particular outer diameter within a tolerance, and the holes in the circuit board may be manufactured to have a particular diameter within another tolerance.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention is directed to a method of manufacturing an object. The method may include determining an actual value of a first attribute of a first component of an object and determining, using a machine learning model and based on the actual value of the first attribute, an optimized value for a second attribute of a second component that is functionally interrelated to the first component in the object. The method may include selecting, from a plurality of second components each having a value for the second attribute within a tolerance range, the second component having the optimized value for the second attribute and manufacturing the object using the first component and the selected second component.

In some embodiments, the method may include, before determining the actual value of the first attribute of the first component, selecting, from a plurality of first components each having a respective value for a respective first attribute within another tolerance range, the first component.

In some embodiments, determining the actual value of the first attribute of the first component may include capturing one or more images of the first component and analyzing the one or more images to determine the actual value of the first attribute of the first component. Additionally, or alternatively, analyzing the one or more images may include analyzing, using another machine learning model, the one or more images to determine the actual value of the first attribute of the first component.

In some embodiments, determining the actual value of the first attribute of the first component may include analyzing data from a manufacturer of the first component.

In some embodiments, the machine learning model may be trained using one or more reinforcement learning techniques.

In some embodiments, the method may include training the machine learning model using historical data including (i) historical actual values of first attributes of first components of historical objects, (ii) historical actual values of second attributes of second components of the historical objects, and/or (iii) historical test results obtained by testing the historical objects.

In some embodiments, the method may include, after manufacturing the object, performing one or more tests on the object to obtain test results and retraining the machine learning model using the actual value of the first attribute of the first component, the optimized value of the second attribute of the second component, and the test results.

In some embodiments, the machine learning model may determine the optimized value of the second attribute of the second component by running a plurality of simulations using the actual value of the first attribute of the first component and the tolerance range for the second attribute of the plurality of second components.

In some embodiments, the first component may include a circuit board, and the first attribute may be a first diameter of a hole in the circuit board. Additionally, or alternatively, the second component may include a pin having a portion configured to be received in the hole via an interference fit, and the second attribute may be a second outer diameter of the portion of the pin configured to be received in the hole via the interference fit. In some embodiments, manufacturing the object may include positioning the portion of the pin in the hole in the circuit board via the interference fit.

In some embodiments, the first component may include an electronic component positioned on a circuit board, and the first attribute may be a position of the electronic component on the circuit board. Additionally, or alternatively, the second component may include an adhesive for securing the electronic component to the circuit board, and the second attribute may include an amount and a position of the adhesive with respect to the electronic component and the circuit board. In some embodiments, manufacturing the object may include applying the amount of the adhesive to the position with respect to the electronic component and the circuit board.

In some embodiments, the first component may include a processor, and the first attribute may include thermal performance of the processor. Additionally, or alternatively, the second component may include a circuit board, and the second attribute may include a position on the circuit board for receiving the processor and an orientation of the position on the circuit board with respect to a coolant flow. In some embodiments, the method may include, before manufacturing the object, determining, using another machine learning model and based on the thermal performance of the processor, the position on the circuit board for receiving the processor, and the orientation of the circuit board with respect to the coolant flow, an optimized thermal performance of a heatsink for cooling the processor on the circuit board and selecting, from a plurality of heatsinks each having a thermal performance value within a respective tolerance range, the heatsink having the optimized thermal performance. Additionally, or alternatively, manufacturing the object may include securing the processor in the position on the circuit board and positioning the heatsink having the optimized thermal performance on the processor.

In another aspect, the present invention is directed to a method of manufacturing an object. The method may include determining a first actual value of a first attribute of a first component of an object and determining a second actual value of a second attribute of a second component of the object. The method may include determining, using a machine learning model and based on the first actual value of the first attribute and the second actual value of the second attribute, an optimized value for a third attribute of a third component that is functionally interrelated to the first component and the second component of the object. The method may include selecting, from a plurality of third components each having a value for the third attribute within a tolerance range, the third component having the optimized value for the third attribute and manufacturing the object using the first component, the second component, and the selected third component.

In some embodiments, the first component may include a processor positioned on a circuit board, and the first attribute may include a first geometry of the processor on the circuit board. Additionally, or alternatively, the second component may include a heatsink for cooling the processor on the circuit board, where the heatsink includes a pedestal for interfacing with the processor, and the second attribute may include a second geometry of the pedestal of the heatsink. In some embodiments, the third component may include a section of thermal interface material, and the third attribute may include a third geometry of the section of the thermal interface material. Additionally, or alternatively, manufacturing the object may include disposing the section of the thermal interface material on the processor positioned on the circuit board and disposing the heatsink with respect to the processor such that the pedestal is positioned on the section of the thermal interface material.

In some embodiments, the first component may include a first section of a shell of a vapor chamber, and the first attribute may include a first geometry of the first section of the shell. Additionally, or alternatively, the second component may include a second section of the shell, and the second attribute may include a second geometry of the second section of the shell. In some embodiments, the third component may include a wicking structure on an interior of the shell, and the third attribute may include a first thickness of the wicking structure in the first section of the shell and a second thickness of the wicking structure in the second section of the shell. Additionally, or alternatively, manufacturing the object may include disposing a first amount-by-weight of powder to the first section of the shell to achieve the first thickness of the wicking structure and disposing a second amount-by-weight of the powder to the second section of the shell to achieve the second thickness of the wicking structure.

In some embodiments, the method may include before determining the actual value of the first attribute of the first component, selecting, from a plurality of first components each having a respective value for a respective first attribute within another tolerance range, the first component.

In some embodiments, determining the actual value of the first attribute of the first component may include capturing one or more images of the first component and analyzing the one or more images to determine the actual value of the first attribute of the first component, where analyzing the one or more images includes analyzing, using another machine learning model, the one or more images to determine the actual value of the first attribute of the first component.

In some embodiments, the method may include training the machine learning model using historical data including (i) historical actual values of first attributes of first components of historical objects, (ii) historical actual values of second attributes of second components of the historical objects, (iii) historical actual values of third attributes of third components of the historical objects, and/or (iv) historical test results obtained by testing the historical objects In another aspect, the present invention is directed to a method of manufacturing an object. The method may include performing a respective step in a series of steps for manufacturing an object to achieve a target outcome of the respective step and, after performing the respective step, capturing one or more images of an actual outcome of the respective step. The method may include providing the one or more images to one or more machine learning models to determine whether the actual outcome of the respective step corresponds to the target outcome of the respective step and, in response to the actual outcome not corresponding to the target outcome, stopping performance of the series of steps and generating a notification. The method may include, in response to the actual outcome corresponding to the target outcome, initiating performance of a subsequent step in the series of steps.

In some embodiments, the series of steps may include a first step of applying a thermal interface material to a surface of a heatsink, where the thermal interface material is adhered to a protective film, a second step of removing the protective film from the thermal interface material, where the second step is performed after the first step is performed, and a third step of disposing a component on the thermal interface material, where the third step is performed after the second step is performed. Additionally, or alternatively, a machine learning model of the one or more machine learning models may be configured to analyze the one or more images to determine whether the protective film was removed from the thermal interface material. In some embodiments, the method may include preventing, in response to determining that the protective film was not removed from the thermal interface material, performance of the third step.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1A:
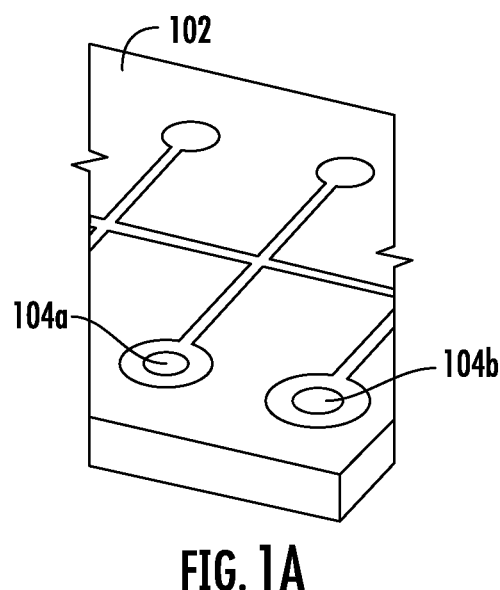
Figure 1B:
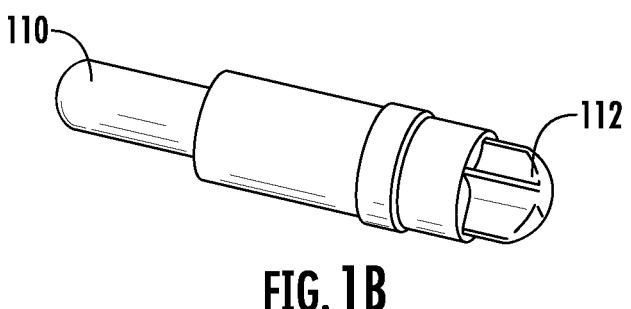
Figure 1C:
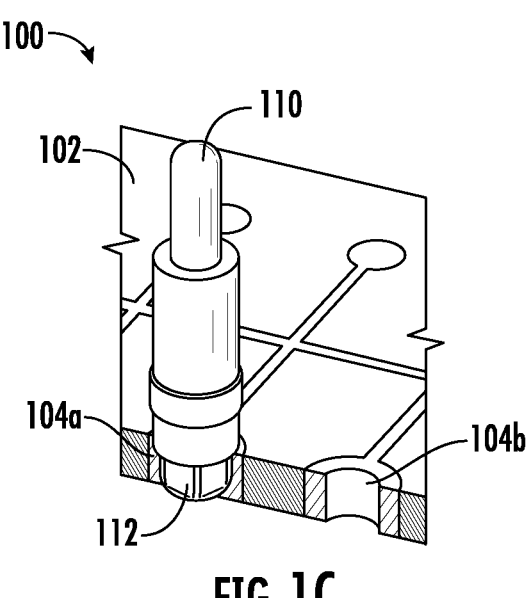
Figure 2:
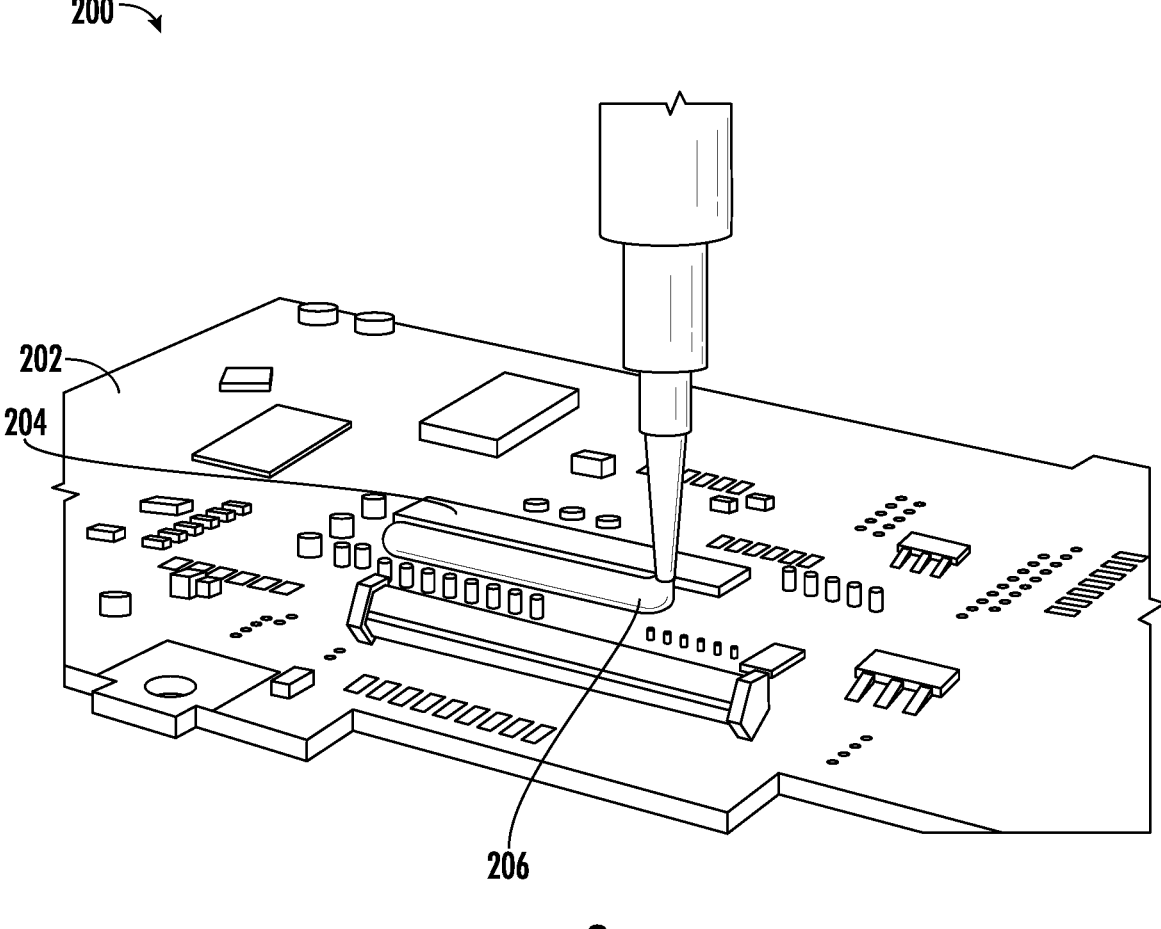
Figure 3:
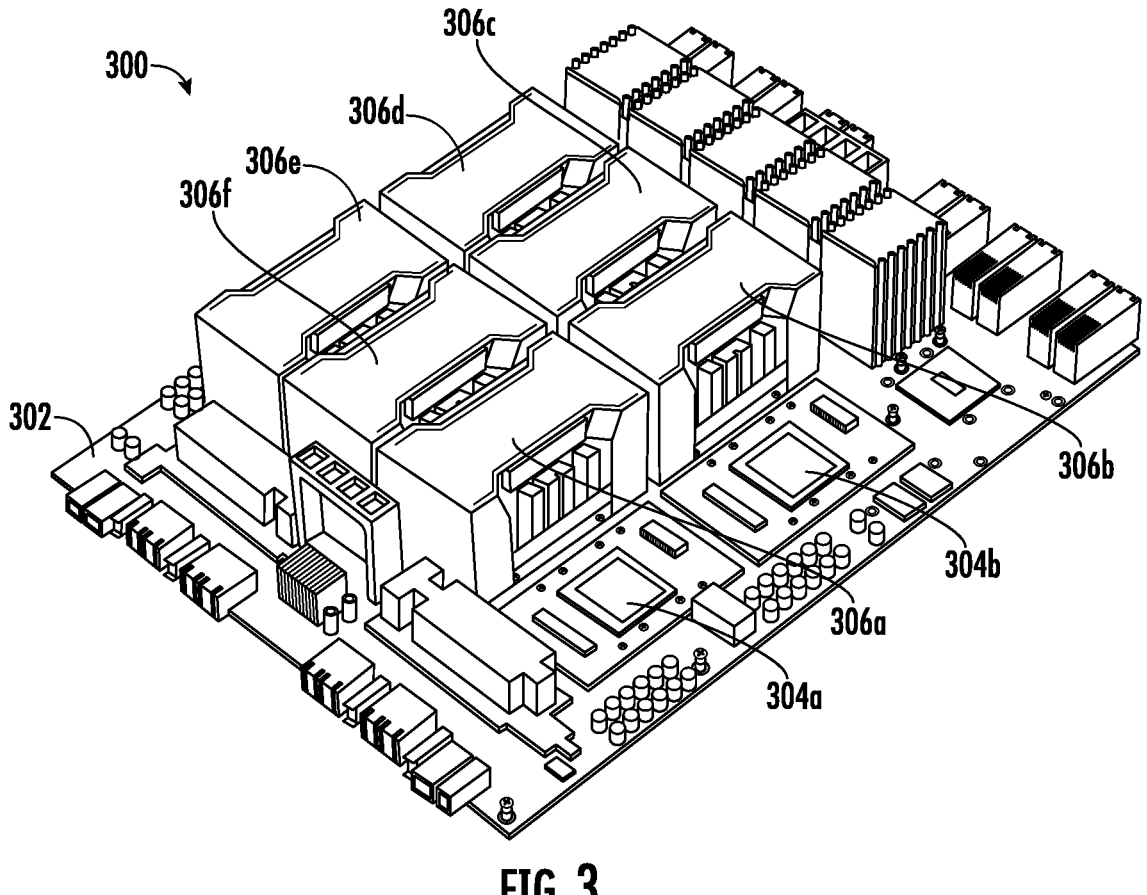
Figure 6:
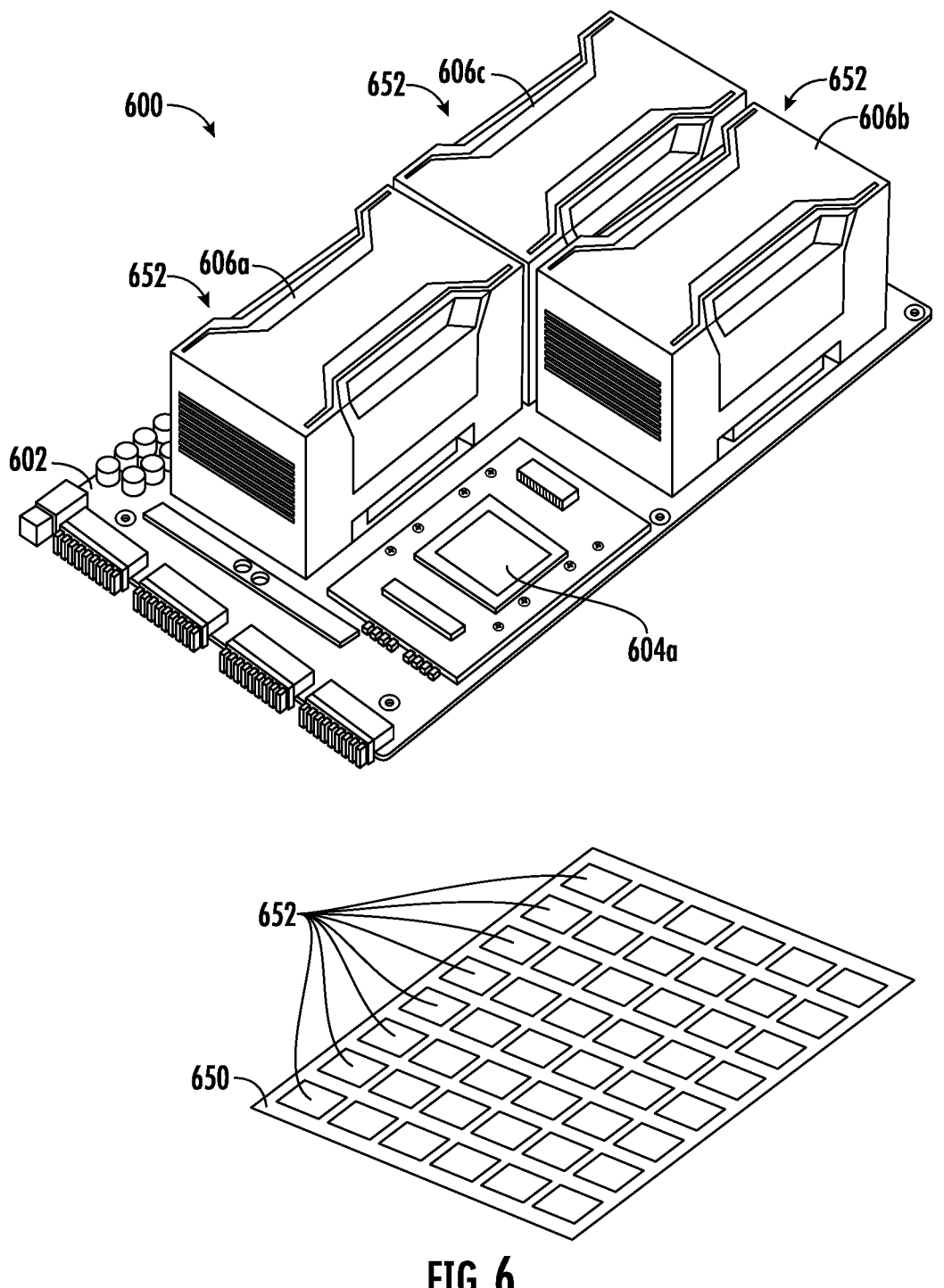
Figure 7:
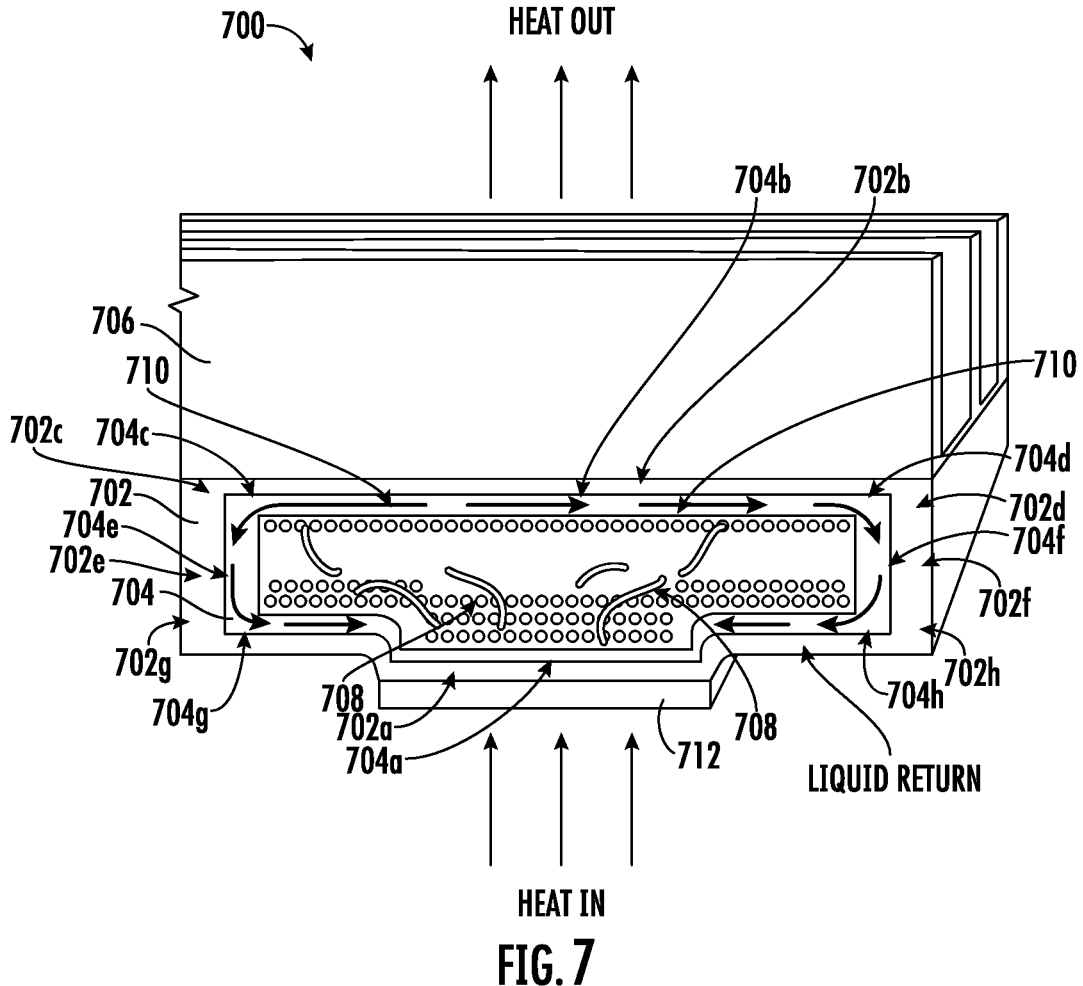
Figure 9:
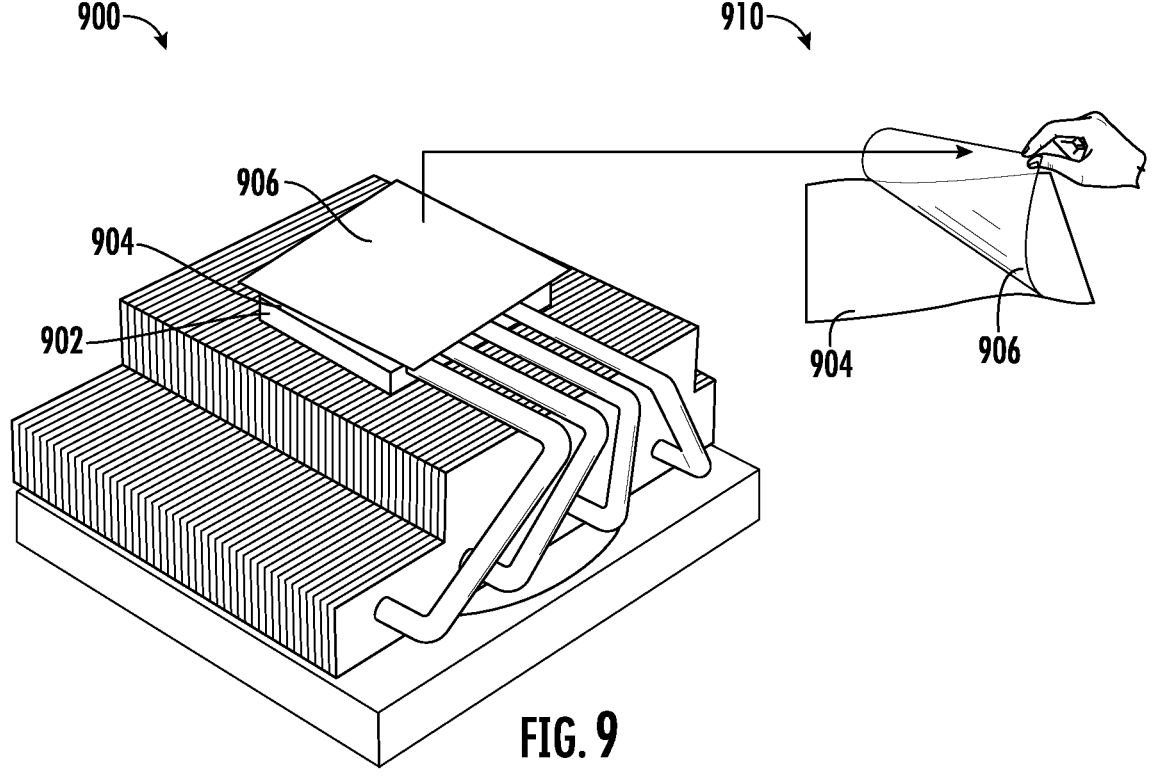
Figure 11:
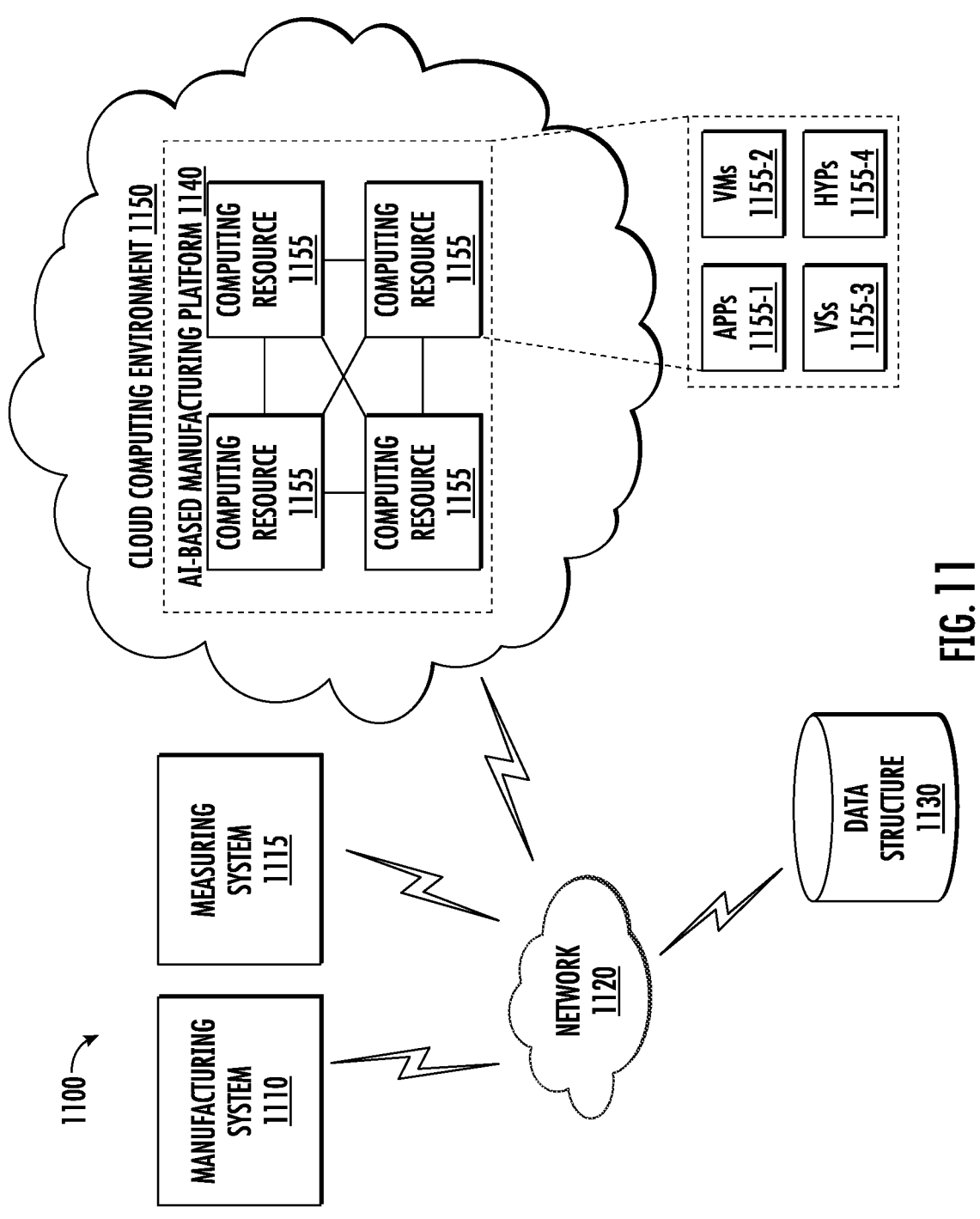
Figure 12:
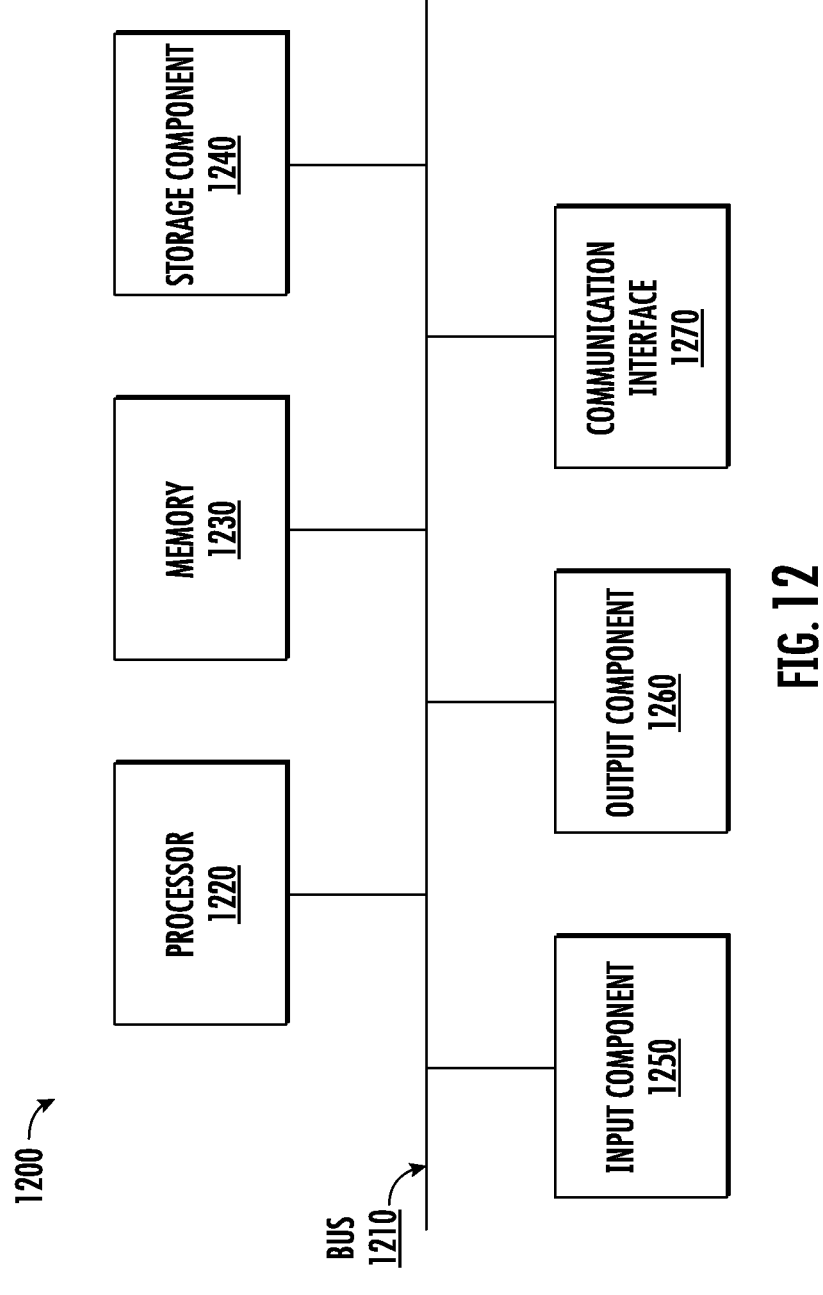

Having thus described embodiments of the invention in general terms, reference will now be made to the accompanying drawings, wherein:

FIGS. 1A-1C illustrate an example of a method for manufacturing an electronic device, in accordance with an embodiment of the invention;

FIG. 2 illustrates an example of another method for manufacturing an electronic device, in accordance with an embodiment of the invention;

FIG. 3 illustrates an example of another method for manufacturing an electronic device, in accordance with an embodiment of the invention;

FIGS. 4A-4D illustrate another example of a method for manufacturing an object, in accordance with an embodiment of the invention;

FIG. 5 illustrates an example of a method for manufacturing an object, in accordance with an embodiment of the invention;

FIG. 6 illustrates an example of another method for manufacturing an electronic device, in accordance with an embodiment of the invention;

FIG. 7 illustrates an example of a method for manufacturing a vapor chamber, in accordance with an embodiment of the invention;

FIG. 8 illustrates another example of a method for manufacturing an object, in accordance with an embodiment of the invention;

FIG. 9 illustrates another example of a method for manufacturing an electronic device, in accordance with an embodiment of the invention;

FIG. 10 illustrates another example of a method for manufacturing an object, in accordance with an embodiment of the invention;

FIG. 11 illustrates a system environment for artificial-intelligence-based manufacturing, in accordance with an embodiment of the invention; and FIG. 12 is a diagram of example components of one or more devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Furthermore, when it is said herein that something is "based on" something else, it may be based on one or more other things as well. In other words, unless expressly indicated otherwise, as used herein "based on" means "based at least in part on" or "based at least partially on." Also, as used herein, the term "or" is intended to be inclusive when used in a series and may be used interchangeably with "and/or," unless explicitly stated otherwise (e.g., if used in combination with "either" or "only one of"). Like numbers refer to like elements throughout. No element, act, or instruction used herein should be construed as critical or essential unless explicitly described as such.

As noted, a manufacturing process for an object may include assembling the object from a plurality of components. Each component may be manufactured to one or more specifications within manufacturing tolerances. For example, an electronic device may include a circuit board and one or more pins to be received within holes in the circuit board via an interference fit. In such an example, the pins may be manufactured to have a particular outer diameter within a tolerance, and the holes in the circuit board may be manufactured to have a particular diameter within another tolerance. However, when manufacturing the electronic device, a pin having an outer diameter at the high end of the tolerance (i.e., a larger outer diameter than other pins) may be positioned within a hole in a circuit board having a diameter at the low end of the tolerance (i.e., a smaller diameter than other holes). The relatively larger size of the pin as compared to the hole in the circuit board may cause the circuit board to fail or otherwise degrade performance of the electronic device. Solutions to such a problem may involve manufacturing components to tighter tolerances and/or requiring tighter tolerances from component suppliers; however, these solutions increase the cost of manufacturing the components and/or the price of the components from a supplier.

Some embodiments described herein provide an artificial-intelligence-based method of manufacturing objects that uses machine learning models to manage manufacturing steps in real-time to achieve optimal performance of the object. For example, the method may include using a machine learning model to analyze images of a hole in a circuit board to determine the hole's actual diameter given manufacturing tolerances for the hole. Alternatively, the hole's actual diameter may be determined based on data from the manufacturer. The method may further include using another machine learning model to determine an optimized value for an outer diameter of a pin to be interference fit within the hole and then selecting a pin having an outer diameter that corresponds to the optimized value. Other examples may include determining an optimal amount and position of adhesive applied for securing a component to a circuit board, determining optimal positioning and orientation of a processor on a circuit board based on the processor's thermal performance, and determining an optimal heatsink to pair with a processor based on the processor's thermal performance and the heatsink's thermal performance. Additional examples may include determining an optimal section of thermal interface material to use based on geometries of a processor and a heatsink and determining an optimal thickness of a porous wicking structure at various locations within the shell of a vapor chamber.

The machine learning models may be trained using one or more reinforcement learning techniques and historical data including actual values for components and test results of objects manufactured using the components. Additionally, manufactured objects may be tested, and the machine learning models may be retrained based on the test results. For some applications, the machine learning models may determine an optimized value for one component by running a plurality of simulations using a determined actual value for a second component and the tolerance range for the one component. By using machine learning models to match components in this manner, the method permits manufacturers to provide components with larger manufacturing tolerances (e.g., for reduced cost) while maintaining or even improving overall performance of the object manufactured using the components.

Some embodiments described herein provide manufacturing methods that use machine learning models to analyze images of the results of a manufacturing step to confirm that the manufacturing step was performed correctly. For example, a manufacturing method may include applying a thermal interface material to a surface of a heatsink, removing a protective film adhered to the thermal interface material, and then positioning another component on the thermal interface material. In such an example, if a technician fails to remove the protective film, the resulting module will not function properly and will need to be disassembled to remove the protective film and then reassembled. To prevent such failures, the manufacturing method may include capturing images of the heatsink and the thermal interface material before positioning the other component on the thermal interface material and analyzing the images to determine whether the protective film was removed from the thermal interface material. By using machine learning models in such a manner, the method can prevent or even eliminate mistakes or failures in the manufacturing process.

FIGS. 1A-1C illustrate an example of a method for manufacturing an electronic device 100, in accordance with an embodiment of the invention. As shown in FIGS. 1A-1C, the electronic device 100 may include a circuit board 102 and a pin 110. As shown in FIG. 1A, the circuit board 102 may include holes 104*a* and 104*b* for receiving pins. As shown in FIG. 1B, the pin 110 may include a portion 112 configured to be received in the hole 104*a* via an interference fit. FIG. 1C illustrates the electronic device 100 with a portion of the circuit board 102 removed to show the interference fit between the hole 104*a* and the portion 112 of the pin 110.

The pin 110 may be manufactured such that the portion 112 has a particular outer diameter within a tolerance, and the hole 104*a* may be manufactured to have a particular diameter within another tolerance. In some embodiments, a method of manufacturing the electronic device 100 may include using one or more machine learning models to analyze images of the hole 104*a* to determine its actual diameter. Additionally, or alternatively, the method may include determining the actual diameter based on data from a manufacturer of the circuit board.

The method may further include using one or more machine learning models to determine, based on the actual diameter of the hole 104*a*, an optimized value for an outer diameter of a portion of a pin to be interference fit within the hole 104*a*. The one or more machine learning models may be trained to determine optimized values that achieve optimal performance of the electronic device 100, such as reliability, durability, energy efficiency, low electrical resistance, and/or the like. For example, the one or more machine learning models may be trained using historical data associated with previously manufactured electronic devices that include circuit boards and pins. The historical data may include actual values of diameters of holes in the circuit boards and outer diameters of portions of pins of the previously manufactured electronic devices, simulation inputs, analytical inputs, and/or historical performance data of the previously manufactured objects (e.g., reliability metrics, durability metrics, energy efficiency metrics, electrical resistance metrics, and/or the like) such that the machine learning models provide optimized values for diameters of holes and outer diameters of portions of pins to achieve optimal performance of electronic devices based on such historical data. By using machine learning models to determine optimized values for each attribute of the components, the method improves the performance of the manufactured electronic device as compared to electronic devices made via manufacturing processes that do not use machine learning models and do not account for deviations from target values due to manufacturing tolerances.

In some embodiments, the method may include using one or more machine learning models to analyze images of portions of a plurality of pins to determine the actual outer diameters of the portions. Additionally, or alternatively, the method may include determining the actual outer diameters based on data from a manufacturer of the pins. The method may include selecting, based on this optimized value, the pin 110 from the plurality of pins because the outer diameter of the portion 112 has the optimized value. The method may further include positioning the portion 112 in the hole 104*a* via an interference fit, as shown in FIG. 1C.

As will be appreciated by one of ordinary skill in the art in view of the present disclosure, the method of manufacturing the electronic device 100 may include additional steps, alternative steps, and/or the like. For example, the method may include determining, using one or more machine learning models, in which hole and/or in which circuit board the pin 110 should be positioned to achieve optimal performance of the electronic device 100. In other words, the hole and/or the circuit board may be selected from a plurality of holes and/or circuit boards based on the outer diameter of the portion 112 of the pin.

FIG. 2 illustrates an example of another method for manufacturing an electronic device 200, in accordance with an embodiment of the invention. As shown in FIG. 2, the electronic device 200 may include a circuit board 202, an electronic component 204, and an adhesive 206 for securing the electronic component 204 to the circuit board 202. In some embodiments, the electronic component 204 may include a processor, a memory chip, a resistor, a capacitor, an electronic module, an electro-mechanical component, a mechanical component, an opto-electrical component, and/or the like.

The electronic component 204 may be configured to be disposed on the circuit board 202 in a particular position within a tolerance, and the adhesive 206 may be configured to be applied to the electronic component 204 and the circuit board 202 in a particular amount within a tolerance and at a particular position with respect to the electronic component and the circuit board within a tolerance. In some embodiments, a method of manufacturing the electronic device 200 may include using one or more machine learning models to analyze images of the electronic component 204 to determine its actual position on the circuit board 202. Additionally, or alternatively, the method may include determining the actual position via measurements.

The method may further include using one or more machine learning models to determine, based on the actual position of the electronic component 204 on the circuit board 202, an optimized value for the amount of the adhesive 206 and an optimized positioning of the adhesive 206. The one or more machine learning models may be trained to determine optimized values that achieve optimal performance of the electronic device 200, such as reliability, durability, energy efficiency, and/or the like. For example, the one or more machine learning models may be trained using historical data associated with previously manufactured electronic devices that include electronic components secured to circuit boards by adhesives. The historical data may include actual positions of electronic components on circuit boards, actual amounts of applied adhesive, and actual positions of applied adhesive of the previously manufactured electronic devices, simulation inputs, analytical inputs, and/or historical performance data of the previously manufactured objects (e.g., reliability metrics, durability metrics, energy efficiency metrics, and/or the like) such that the machine learning models provide optimized positions of electronic components on circuit boards, optimized amounts of applied adhesive, and optimized positions of applied adhesive to achieve optimal performance of electronic devices based on the historical data. By using machine learning models to determine optimized values for each attribute of the components, the method improves the performance of the manufactured electronic device as compared to electronic device made via manufacturing processes that do not use machine learning models and do not account for deviations from target values due to manufacturing tolerances.

The method may further include applying the optimized value for the amount of the adhesive 206 at the optimized positioning with respect to the electronic component and the circuit board, as shown in FIG. 2. In some embodiments, the method may include using one or more machine learning models to analyze images of the adhesive 206, the electronic component 204, and the circuit board 202 while the adhesive 206 is being applied to the electronic component 204 and the circuit board 202. Additionally, or alternatively, the method may include adjusting, in real time, the optimized value for the amount of the adhesive 206 and the optimized positioning of the adhesive 206 based on the images of the adhesive 206, the electronic component 204, and the circuit board 202 while the adhesive 206 is being applied to the electronic component 204 and the circuit board 202.

As will be appreciated by one of ordinary skill in the art in view of the present disclosure, the method of manufacturing the electronic device 200 may include additional steps, alternative steps, and/or the like. For example, the method may include determining, using one or more machine learning models, an optimized positioning of the electronic component 204 on the circuit board 202 to achieve optimal performance of the electronic device 200.

FIG. 3 illustrates an example of another method for manufacturing an electronic device 300, in accordance with an embodiment of the invention. As shown in FIG. 3, the electronic device 300 may include a circuit board 302, processors 304*a* and 304*b*, and heatsinks 306*a*-306*f*. As also shown in FIG. 3, the processors 304*a* and 304*b* may be positioned on the circuit board 302. Although not shown in FIG. 3, the electronic device 300 may also include additional processors positioned on the circuit board 302 beneath the heatsinks 306*a*-306*f*. In this regard, the heatsinks 306*a*-306*f* may be positioned on top of the processors to cool the processors. Furthermore, the electronic device 300 may include two additional heatsinks, not shown in FIG. 3, positioned on top of the processors 304*a* and processor 304*b*, respectively.

In some embodiments, a method of manufacturing the electronic device 300 may include determining thermal performance of one or more of the processors (e.g., how much heat the processor generates at different processing loads and/or speeds, how quickly the processor cools at different processing loads and/or speeds, and/or the like). For example, the method may include performing one or more thermal tests on a processor to determine the thermal performance of the processor. As another example, the method may include determining the thermal performance of a processor based on data from a manufacturer of the processor.

In some embodiments, the method of manufacturing the electronic device 300 may include using one or more machine learning models to determine, based on thermal performances of one or more processors, a position on the circuit board 302 for receiving the one or more of the processors and an orientation of the position on the circuit board with respect to a coolant flow (e.g., a coolant flow provided by one or more cooling systems in a data center in which the electronic device 300 will be positioned). The one or more machine learning models may be trained to determine optimized positions and orientations with respect to coolant flows that achieve optimal performance of the electronic device 300, such as thermal performance, computing performance, reliability, durability, energy efficiency, and/or the like. For example, the one or more machine learning models may be trained using historical data associated with previously manufactured electronic devices that include processors positioned on circuit boards that are positioned in various orientations with respect to coolant flows in data centers. The historical data may include actual values of thermal performance of the processors, actual positions of the processors on the circuit boards, and actual orientations of the processors with respect to coolant flows of the previously manufactured electronic devices, simulation inputs, analytical inputs, and/or historical performance data of the previously manufactured electronic devices (e.g., thermal performance metrics, computing performance metrics, reliability metrics, durability metrics, energy efficiency metrics, and/or the like) such that the machine learning models provide optimized positions and orientations with respect to coolant flows that achieve optimal performance of electronic devices. By using machine learning models to determine optimized positions and orientations with respect to coolant flows, the method improves the performance of the manufactured electronic device as compared to electronic devices made via manufacturing processes that do not use machine learning models and do not account for positioning of the processors on the circuit boards and orientations of the processors with respect to coolant flows.

In some embodiments, the method may further include securing the one or more of the processors on the circuit board 302 at the determined position(s) and orientation(s). For example, the method may include securing the processor 304*a* and the processor 304*b* on the circuit board 302 in the positions and orientations shown in FIG. 3 based on the result of determining, using the one or more machine learning models, that such positions and orientations for the processor 304*a* and the processor 304*b* optimize performance of the electronic device 300.

In some embodiments, the method of manufacturing the electronic device 300 may include determining thermal performance of the heatsinks 306*a*-306*f* and the two additional heatsinks not shown in FIG. 3 positioned on the processors 304*a* and 304*b*, collectively referred to as the heatsinks. The thermal performance of a given heatsink may correspond to how much heat the heatsink can remove from its corresponding processor, how quickly the heatsink can remove from heat from its corresponding processor, and/or the like. For example, the method may include performing one or more thermal tests on the heatsinks to determine the thermal performance of the heatsinks. As another example, the method may include determining the thermal performance of the heatsinks based on data from manufacturers of the heatsinks.

In some embodiments, the method of manufacturing the electronic device 300 may include using one or more machine learning models to determine, based on the thermal performances of the one or more processors, the positions of the one or more processors, and the orientations of the one or more processors, an optimized thermal performance of a respective heatsink for cooling each of the one or more processors on the circuit board 302. The one or more machine learning models may be trained to determine optimized thermal performances of heatsinks that achieve optimal performance of the electronic device 300, such as thermal performance, computing performance, reliability, durability, energy efficiency, and/or the like.

For example, the one or more machine learning models may be trained using historical data associated with previously manufactured electronic devices that include processors positioned on circuit boards that are positioned in various orientations with respect to coolant flows in data centers and heatsinks positioned on the processors. The historical data may include actual values of thermal performance of the heatsinks, actual values of thermal performance of the processors, actual positions of the processors on the circuit boards, and actual orientations of the processors with respect to coolant flows of the previously manufactured electronic devices, simulation inputs, analytical inputs, and/or historical performance data of the previously manufactured electronic devices (e.g., thermal performance metrics, computing performance metrics, reliability metrics, durability metrics, energy efficiency metrics, and/or the like) such that the machine learning models provide optimized thermal performances of heatsinks that achieve optimal performance of electronic devices. By using machine learning models to determine optimized thermal performances of heatsinks, the method improves the performance of the manufactured electronic device as compared to electronic devices made via manufacturing processes that do not use machine learning models and do not account for thermal performances of heatsinks, thermal performances of processors on which the heatsinks are positioned, positioning of the processors and heatsinks on the circuit boards, and orientations of the processors and heatsinks with respect to coolant flows.

In some embodiments, the method may further include positioning one or more of the heatsinks on the corresponding processors. For example, the method may include securing the two additional heatsinks not shown in FIG. 3 on the processor 304a and the processor 304b based on the result of determining, using the one or more machine learning models, that the respective thermal performances of the two additional heatsinks optimize performance of the electronic device 300 when the two additional heatsinks are positioned on the processor 304a and the processor 304b, respectively. In this way, the method may include using machine learning models to select positions and orientations of the processors on the circuit board 302 and to select heatsinks to position on each processor that optimize performance of the electronic device 300.

As will be appreciated by one of ordinary skill in the art in view of the present disclosure, the method of manufacturing the electronic device 300 may include additional steps, alternative steps, and/or the like. For example, the method may include initially determining, using one or more machine learning models, an optimized thermal performance of a heatsink for positioning on a processor based on thermal performance of the processor and then determining, using one or more machine learning models, an optimized position on the circuit board 302 and orientation with respect to a coolant flow for the processor and the heatsink.

Figure 4A:
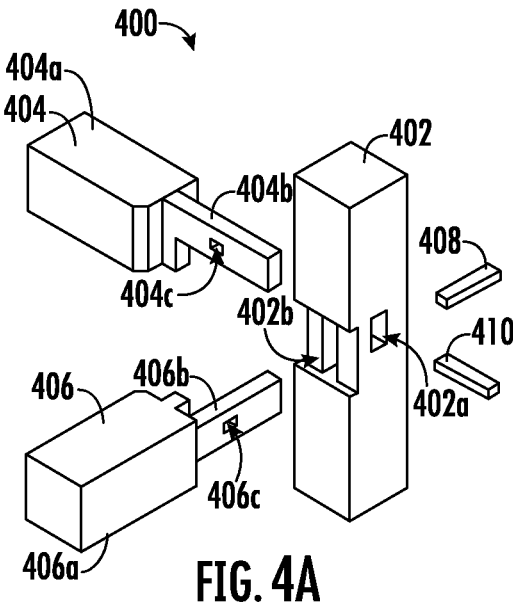
Figure 4B:
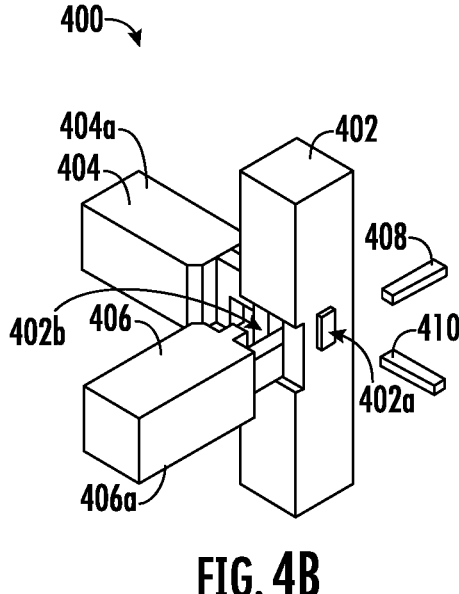
Figure 4C:
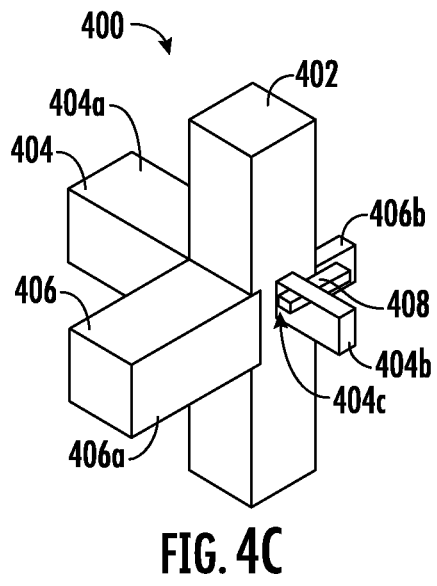

FIGS. 4A-4C illustrate another example of a method for manufacturing an object 400, in accordance with an embodiment of the invention. As shown in FIGS. 4A-4C, the object 400 may include a central member 402, a first horizontal member 404, a second horizontal member 406, a first locking member 408, and a second locking member 410.

Figure 4D:
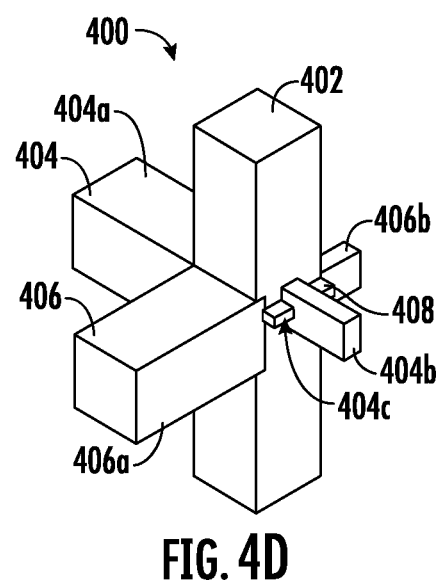

As shown in FIG. 4A, the central member 402 may include a first central opening 402a for receiving the first horizontal member 404 and a second central opening 402b for receiving the second horizontal member 406. As shown in FIGS. 4B-4D, the first horizontal member 404 may be inserted through the first central opening 402a, and the second horizontal member 406 may be inserted through the second central opening 402b. In some embodiments, the central member 402, the first horizontal member 404, and the second horizontal member 406 may be configured such that the first horizontal member 404 and the second horizontal member 406 may be simultaneously inserted through the first central opening 402a and the second central opening 402b, respectively.

As shown in FIG. 4A, the first horizontal member 404 may include a first body 404a and a first extension 404b that extends outward from the first body 404a. The first extension 404b may include a first opening 404c. Similarly, and as also shown in FIG. 4A, the second horizontal member 406 may include a second body 406a and a second extension 406b that extends outward from the second body 406a. The second extension 406b may include a second opening 406c.

As shown in FIG. 4B, the first horizontal member 404 may be advanced such that the first extension 404b extends through the first central opening 402a in the central member 402, and the second horizontal member 406 may be advanced such that the second extension 406b extends through the second central opening 402b in the central member 402. As shown in FIG. 4C, the first horizontal member 404 and the second horizontal member 406 may be further advanced such that portions of the first extension 404b and the second extension 406b including the first opening 404c and the second opening 406c, respectively, extend beyond the central member 402 on a side of the central member 402 opposite the first body 404a and the second body 406a, respectively.

In this regard, the dimensions of the central member 402, the first body 404a, the first extension 404b, the first opening 404c, the second body 406a, the second extension 406b, the second opening 406c, the first central opening 402a, and the second central opening 402b may be configured such that the central member 402, the first horizontal member 404, and the second horizontal member 406 complementarily interface with each other. For example, the central member 402, the first horizontal member 404, and the second horizontal member 406 may complementarily interface with each other such that the first horizontal member 404 and the second horizontal member 406 interlock within the central member 402 to maintain horizontal orientations of the first horizontal member 404 and the second horizontal member 406.

As shown in FIGS. 4C and 4D, the first locking member 408 may be advanced through the first opening 404c in the first extension 404b. Similarly, although not visible in FIGS. 4C and 4D, the second locking member 410 may be advanced through the second opening 406c in the second extension 406b.

In this regard, the dimensions of the central member 402, the first extension 404b, the first opening 404c, and the first locking member 408 may be configured such that, when the first locking member 408 is inserted into the first opening 404c, the first horizontal member 404 is fixedly secured to the central member 402. In other words, the first horizontal member 404 is prevented from moving relative to the central member 402 after the first locking member 408 is inserted into the first opening 404c.

Similarly, the dimensions of the central member 402, the second extension 406b, the second opening 406c, and the second locking member 410 may be configured such that, when the second locking member 410 is inserted into the second opening 406c, the second horizontal member 406 is fixedly secured to the central member 402. In other words, the second horizontal member 406 is prevented from moving with relative to the central member 402 after the second locking member 410 is inserted into the second opening 406c.

In some embodiments, one or more manufacturers may provide a plurality of central members, a plurality of first horizontal members, a plurality of second horizontal members, a plurality of first locking members, and a plurality of second locking members (e.g., similar to the central member 402, the first horizontal member 404, the second horizontal member 406, the first locking member 408, and the second locking member 410). Each of the central members, the first horizontal members, the second horizontal members, the first locking members, and the second locking members may be manufactured to have particular dimensions within manufacturing tolerances.

In some embodiments, the method of manufacturing the object 400 may include determining actual dimensions of each of the central members, the first horizontal members, the second horizontal members, the first locking members, and the second locking members. For example, the method may include capturing one or more images of the each of the central members, the first horizontal members, the second horizontal members, the first locking members, and the second locking members to determine the actual dimensions. In some embodiments, the method may include using image-based measuring techniques to analyze the one or more images to determine the actual dimensions of each of the central members, the first horizontal members, the second horizontal members, the first locking members, and the second locking members. As another example, the method may include analyzing the one or more images using one or more machine learning models to determine the actual dimensions of each of the central members, the first horizontal members, the second horizontal members, the first locking members, and the second locking members.

Additionally, or alternatively, the method may include analyzing data from a manufacturer of the central members, the first horizontal members, the second horizontal members, the first locking members, and the second locking members to determine the actual dimensions. For example, the manufacturer of the central members, the first horizontal members, the second horizontal members, the first locking members, and the second locking members may provide technical data (e.g., a specification document, a table of measurement data, and/or the like) including actual dimensions of each of the central members, the first horizontal members, the second horizontal members, the first locking members, and the second locking members as determined and/or measured by the manufacturer after manufacturing the central members, the first horizontal members, the second horizontal members, the first locking members, and the second locking members.

In some embodiments, the method of manufacturing the object 400 may include selecting the central member 402 from the plurality of central members provided by one or more manufacturers and determining the actual dimensions of the central member 402. For example, the method may include determining the actual dimensions of the first central opening 402*a* and the second central opening 402*b*. In such embodiments, the method may include determining, using one or more machine learning models and based on the actual dimensions of the central member 402, optimized dimensions of a first horizontal member, a second horizontal member, a first locking member, and a second locking member.

The one or more machine learning models may be trained to determine optimized dimensions of a first horizontal member, a second horizontal member, a first locking member, and a second locking member that achieve optimal performance of the object 400, such as strength, reliability, durability, and/or the like. For example, the one or more machine learning models may be trained using historical data associated with previously manufactured objects that include central members, first horizontal members, second horizontal members, first locking members, and second locking members. The historical data may include actual dimensions of the central members, the first horizontal members, the second horizontal members, the first locking members, and the second locking members of the previously manufactured objects, simulation inputs, analytical inputs, and/or historical performance data of the previously manufactured objects (e.g., strength metrics, reliability metrics, durability metrics, and/or the like) such that the machine learning models provide optimized dimensions of a first horizontal member, a second horizontal member, a first locking member, and a second locking member that achieve optimal performance of the objects. By using machine learning models to determine optimized dimensions of first horizontal members, second horizontal members, first locking members, and second locking members, the method improves the performance of the object as compared to objects made via manufacturing processes that do not use machine learning models and do not account for actual dimensions of the central member.

In some embodiments, the method of manufacturing the object 400 may include selecting, from the pluralities of central members, first horizontal members, second horizontal members, first locking members, and second locking members provided by the one or more manufacturers, a first horizontal member, a second horizontal member, a first locking member, and a second locking member each having the respective optimized dimensions determined using the machine learning models. For example, the method may include selecting the first horizontal member 404, the second horizontal member 406, the first locking member 408, and the second locking member 410 because they have the respective optimized dimensions determined using the machine learning models.

The method may further include assembling the object 400 using the selected first horizontal member, the selected second horizontal member, the selected first locking member, and the selected second locking member. For example, the method may include inserting the first horizontal member 404 through the first central opening 402*a* and inserting the second horizontal member 406 through the second central opening 402*b*. The method may further include advancing the first horizontal member 404 and the second horizontal member 406 such that portions of the first extension 404*b* and the second extension 406*b* including the first opening 404*c* and the second opening 406*c*, respectively, extend beyond the central member 402 on a side of the central member 402 opposite the first body 404*a* and the second body 406*a*, respectively. The method may further include advancing the first locking member 408 through the first opening 404*c* in the first extension 404*b* and advancing the second locking member 410 through the second opening 406*c* in the second extension 406*b*. In this way, the object 400 may be manufactured from components having dimensions that ensure optimal performance of the object 400 despite the manufacturing tolerances associated with the dimensions of each component.

As will be appreciated by one of ordinary skill in the art in view of the present disclosure, the method of manufacturing the object 400 may include additional steps, alternative steps, and/or the like. For example, the method may include initially determining dimensions of one or more other components of the object 400 (i.e., rather than the central member 402) and then determining, using one or more machine learning models, optimized dimensions of the remaining components of the object 400.

FIG. 5 illustrates an example of a method 500 for manufacturing an object, in accordance with an embodiment of the invention. In some embodiments, one or more manufacturing systems, one or more measuring systems, one or more artificial-intelligence-based manufacturing platforms, and/ or the like may perform one or more of the steps of the method 500. The object may include a plurality of components. For example, the object may be one or more of the electronic devices 100, 200, and 300 as shown and described herein with respect to FIGS. 1-3, respectively, and the components may include circuit boards, pins, electronic components, adhesives, processors, heatsinks, and/or the like, such as those shown and described herein with respect to FIGS. 1-3. As another example, the object may be the object 400 as shown and described herein with respect to FIGS. 4A-4C, and the components may include the central member 402, the first horizontal member 404, the second horizontal member 406, the first locking member 408, and the second locking member 410. As shown in FIG. 5, the method 500 includes steps shown in blocks 502-508. Although only the steps in blocks 502-508 are shown in FIG. 5, the method 500 may include additional steps.

As shown in block 502, the method 500 may include determining an actual value of a first attribute of a first component of an object. In some embodiments, the first component may be manufactured to have a particular value of the first attribute within a manufacturing tolerance. For example, within the context of FIGS. 1A-1C, the first component may be a hole within a circuit board, the first attribute may be a diameter of the hole, and the method may include determining the actual value of the hole. As another example, within the context of FIG. 2, the first component may be an electronic component positioned on a circuit board, the first attribute may be a position of the electronic component on the circuit board, and the method may include determining the actual position of the electronic component on the circuit board. As another example, within the context of FIG. 3, the first component may be a processor, the first attribute may be thermal performance of the processor, and the method may include determining the thermal performance of the processor. As another example, within the context of FIGS. 4A-4C, the first component may be a central member, the first attribute may be dimensions of the central member, and the method may include determining the actual dimensions of the central member (e.g., actual dimensions of the first central opening 402a, the second central opening 402b, and/or the like).

In some embodiments, the method 500 may include, before determining the actual value of the first attribute of the first component, selecting, from a plurality of first components each having a respective value for a respective first attribute within a tolerance range, the first component. For example, the first component may be a pin having a portion configured to be interference fit within a circuit board, and the method may include selecting the pin from a plurality of pins, where the pins have been manufactured such that their portions have a particular outer diameter within a manufacturing tolerance.

In some embodiments, the method 500 may include capturing one or more images of the first component and analyzing the one or more images to determine the actual value of the first attribute of the first component. For example, the method 500 may include using image-based measuring techniques to analyze the one or more images to determine the actual value of the first attribute of the first component. As another example, the method 500 may include analyzing the one or more images using one or more machine learning models to determine the actual value of the first attribute of the first component.

In some embodiments, the method 500 may include analyzing data from a manufacturer of the first component to determine the actual value of the first attribute. For example, the manufacturer of the first component may provide technical data (e.g., a specification document, a table of measurement data, and/or the like) including actual values of attributes of the first component as determined and/or measured by the manufacturer after manufacturing the first component.

As shown in block 504, the method 500 may include determining, using a machine learning model and based on the actual value of the first attribute, an optimized value for a second attribute of a second component that is functionally interrelated to the first component in the object. For example, within the context of FIGS. 1A-1C, the second component may be a pin having a portion configured to be received in the hole of a circuit board via an interference fit, and the second attribute may be an outer diameter of the portion of the pin configured to be received in the hole via the interference fit. In such an example, the method 500 may include determining an optimized value for the outer diameter of the portion of the pin using a machine learning model and based on the actual diameter of the hole in the circuit board.

As another example, within the context of FIG. 2, the second component may be an adhesive for securing an electronic component to a circuit board, and the second attribute may include an amount and a position of the adhesive with respect to the electronic component and the circuit board. In such an example, the method 500 may include determining an optimized amount of the adhesive and an optimal position of the adhesive with respect to the electronic component and the circuit board using a machine learning model and based on the actual position of the electronic component on the circuit board.

As another example, within the context of FIG. 3, the second component may include a circuit board, and the second attribute may include a position on the circuit board for receiving a processor and an orientation of the position on the circuit board with respect to a coolant flow. In such an example, the method 500 may include determining an optimized position on the circuit board for the processor and an optimized orientation of the position on the circuit board with respect to the coolant flow using a machine learning model and based on the thermal performance of the processor.

As another example, within the context of FIGS. 4A-4C, the second component may include a horizontal member (e.g., the first horizontal member 404 and/or the second horizontal member 406), and the second attribute may include dimensions of the horizontal member. In such an example, the method 500 may include determining optimized dimensions of the horizontal member using a machine learning model and based on the actual dimensions of the central member.

In some embodiments, the machine learning model may be trained using one or more reinforcement learning techniques. Additionally, or alternatively, the machine learning model may determine optimized values of attributes of components of objects by running a plurality of simulations. For example, the machine learning model may determine the optimized value of the second attribute of the second component by running a plurality of simulations using the actual value of the first attribute of the first component and the tolerance range for the second attribute of the plurality of second components.

In some embodiments, the method 500 may include training the machine learning model to determine optimized values of attributes of components of objects (e.g., to obtain optimal performance of the objects) using historical data. For example, the historical data may include (i) historical actual values of first attributes of first components of historical objects, (ii) historical actual values of second attributes of second components of the historical objects, and/or (iii) historical test results obtained by testing the historical objects. By training the machine learning model on such historical data, the machine learning model may be configured to determine and/or predict optimized values of attributes of components of objects such that the objects manufactured with components having attributes with the optimized values perform better when tested.

As shown in block 506, the method 500 may include selecting, from a plurality of second components each having a value for the second attribute within a tolerance range, the second component having the optimized value for the second attribute. For example, within the context of FIGS. 1A-1C, the method 500 may include selecting, from a plurality of pins, a pin having the optimized value for the outer diameter of the portion of the pin configured to be received in the hole of the circuit board via the interference fit. As another example, within the context of FIG. 2, the method 500 may include selecting an amount and a position of the adhesive to be applied to the electronic component and the circuit board. As yet another example, within the context of FIG. 3, the method 500 may include selecting the optimized position on the circuit board for the processor and selecting the optimized orientation with respect to the coolant flow for the processor. As yet another example, within the context of FIGS. 4A-4C, the method 500 may include selecting a horizontal member having the optimized dimensions.

As shown in block 508, the method 500 may include manufacturing the object using the first component and the selected second component. For example, within the context of FIGS. 1A-1C, the method 500 may include positioning the portion of the selected pin in the hole in the circuit board via the interference fit. As another example, within the context of FIG. 2, the method 500 may include applying the amount of the adhesive to the position with respect to the electronic component and the circuit board. As yet another example, within the context of FIG. 3, the method 500 may include securing the processor at the optimized position on the circuit board and in the optimized orientation with respect to the coolant flow.

Continuing in the context of FIG. 3, the method 500 may further include determining, using another machine learning model and based on the thermal performance of the processor, the position on the circuit board for receiving the processor, and the orientation of the circuit board with respect to the coolant flow, an optimized thermal performance of a heatsink for cooling the processor on the circuit board. In other words, the method 500 may include using another machine learning model to determine an optimized thermal performance of a heatsink for cooling the processor on the circuit board. As noted with respect to FIG. 3, the machine learning model may be trained using historical data to determine optimized thermal performances of heatsinks that achieve optimal performance of electronic devices. The method 500 may further include selecting, from a plurality of heatsinks each having a thermal performance value within a respective tolerance range, the heatsink having the optimized thermal performance and positioning the selected heatsink on the processor.

As yet another example, within the context of FIGS. 4A-4C, the method 500 may include inserting the selected horizontal member having the optimized dimensions through a central opening in the central member. For example, the selected horizontal member may correspond to the first horizontal member 404, and the method 500 may include inserting the first horizontal member 404 through the first central opening 402a of the central member 402.

In some embodiments, the method 500 may include, after manufacturing the object, performing one or more tests on the object to obtain test results and retraining the machine learning model using the actual value of the first attribute of the first component, the optimized value of the second attribute of the second component, and the test results. By retraining the machine learning model, the method 500 may further improve the machine learning model's ability to determine optimized values of attributes of components of objects (e.g., to obtain optimal performance of the objects).

Method 500 may include additional embodiments, such as any single embodiment or any combination of embodiments described herein. Although FIG. 5 shows example blocks of method 500, in some embodiments, method 500 may include additional blocks, fewer blocks, different blocks, or differently arranged blocks than those depicted in FIG. 5. Additionally, or alternatively, two or more of the blocks of method 500 may be performed in parallel.

FIG. 6 illustrates an example of another method for manufacturing an electronic device 600, in accordance with an embodiment of the invention. As shown in FIG. 6, the electronic device 600 may include a circuit board 602, processor 604a, and heatsinks 606a-606c. As also shown in FIG. 6, the processor 604a may be positioned on the circuit board 602. Although not shown in FIG. 6, the electronic device 600 may also include additional processors positioned on the circuit board 602 beneath the heatsinks 606a-606c. In this regard, the heatsinks 606a-606c may include a pedestal for interfacing with the top of the processors to cool the processors. Furthermore, the electronic device 600 may include an additional heatsink, not shown in FIG. 6, including a pedestal for interfacing with the top of the processor 604a.

As shown in FIG. 6, a sheet 650 may include a plurality of sections of thermal interface material 622. As also shown in FIG. 6, a section of thermal interface material 652 may be positioned between each pedestal of each of the heatsinks 606a-606c and its respective processor. The sections of thermal interface material 652 may be configured to improve heat transfer from the processors to the heatsinks 606a-606c.

In some embodiments, a method of manufacturing the electronic device 600 may include determining the geometry of one or more processors positioned on the circuit board 602. For example, the method may include capturing one or more images of a processor and analyzing the one or more images to determine the actual geometric configuration of the surface of the processor that will interface with the pedestal of a heatsink. The method may include using image-based measuring techniques to analyze the one or more images to determine the actual geometric configuration of the surface of the processor. As another example, the method may include analyzing the one or more images using one or more machine learning models to determine the actual geometric configuration of the surface of the processor.

In some embodiments, the method of manufacturing the electronic device 600 may include determining the geometry of a pedestal of a heatsink to be positioned on the processor. For example, the method may include capturing one or more images of the pedestal of the heatsink and analyzing the one or more images to determine the actual geometric configuration of the surface of the pedestal that will interface with the processor. The method may include using image-based measuring techniques to analyze the one or more images to determine the actual geometric configuration of the surface of the pedestal. As another example, the method may include analyzing the one or more images using one or more machine learning models to determine the actual geometric configuration of the surface of the pedestal.

In some embodiments, the method of manufacturing the electronic device 600 may include determining, using one or more machine learning models and based on the geometries of the processor and the heatsink, an optimized geometry of a section of thermal interface material, such as dimensions of the section, a thickness of the section, a variation of thickness across a surface area of the section, and/or the like. The one or more machine learning models may be trained to determine optimized geometries of sections of thermal interface material that achieve optimal performance of the processor, the heatsink, and/or the electronic device 600, such as thermal performance, computing performance, reliability, durability, energy efficiency, and/or the like. For example, the one or more machine learning models may be trained using historical data associated with previously manufactured electronic devices that include sections of thermal interface material positioned between heatsinks and processors positioned on circuit boards. The historical data may include actual values of geometries of the processors, actual geometries of pedestals of the heatsinks, and actual geometries of the sections of thermal interface material of the previously manufactured electronic devices, simulation inputs, analytical inputs, and/or historical performance data of the previously manufactured electronic devices (e.g., thermal performance metrics, computing performance metrics, reliability metrics, durability metrics, energy efficiency metrics, and/or the like) such that the machine learning models provide optimized geometries of sections of thermal interface material that achieve optimal performance of electronic devices. By using machine learning models to determine optimized geometries of sections of thermal interface material, the method improves the performance of the manufactured electronic device as compared to electronic devices made via manufacturing processes that do not use machine learning models and do not account for geometries of processors, geometries of pedestals of heatsinks, and/or geometries of sections of thermal interface material.

In some embodiments, the method of manufacturing the electronic device 600 may include selecting, from the sheet 650, a section of thermal interface material 652 having the optimized geometry. Additionally, or alternatively, the method may include determining the geometry of each section of thermal interface material 652 on the sheet 650. For example, the method may include capturing one or more images of each section of thermal interface material 652 and analyzing the one or more images to determine the actual geometric configuration of each surface of section of thermal interface material 652. The method may include using image-based measuring techniques to analyze the one or more images to determine the actual geometric configuration of each surface of section of thermal interface material 652. As another example, the method may include analyzing the one or more images using one or more machine learning models to determine the actual geometric configuration of each surface of section of thermal interface material 652.

In some embodiments, the method of manufacturing the electronic device 600 may include disposing the section of thermal interface material 652 having the optimized geometry on the processor positioned on the circuit board 602. The method may further include disposing the heatsink with respect to the processor such that the pedestal of the heatsink is positioned on the section of thermal interface material 652. In this way, the method may include using machine learning models to select sections of thermal interface material based on geometries of the processors and heatsink pedestals between which they will be disposed that optimize performance of the electronic device 600.

As will be appreciated by one of ordinary skill in the art in view of the present disclosure, the method of manufacturing the electronic device 600 may include additional steps, alternative steps, and/or the like. For example, the method may include determining, using one or more machine learning models, an optimized geometry of a pedestal of a heatsink for positioning on a processor based on the geometry of a processor and/or the geometry of sections of thermal interface material.

FIG. 7 illustrates an example of a method for manufacturing a vapor chamber 700, in accordance with an embodiment of the invention. As shown in FIG. 7, the vapor chamber 700 may include an outer shell 702 and a porous wicking structure 704 formed from powder positioned within the outer shell 702 (e.g., on the interior of the outer shell 702). As also shown in FIG. 7, the vapor chamber 700 may include multiple cooling fins 706. The vapor chamber 700 may be positioned such that a surface 712 of the outer shell 702 is adjacent one or more surfaces of another device that generates heat, and the vapor chamber 700 may absorb and dissipate the heat to cool the other device. The vapor chamber 700 may further include a liquid (e.g., water) positioned within the outer shell 702 for facilitating the absorption and dissipation of the heat.

As shown in FIG. 7, the outer shell 702 may include a plurality of shell sections 702a-702h. Similarly, and as also shown in FIG. 7, the porous wicking structure 704 may include a plurality of wicking sections 704a-704h, which include an evaporator section 704a and a condenser section 704b. In some embodiments, each of the shell sections 702a-702h and each of the wicking sections 704a-704h may be manufactured to have a particular thickness within a manufacturing tolerance.

As shown in FIG. 7, the vapor chamber 700 may include an evaporator region 708, and the porous wicking structure 704 may include the evaporator section 704a in proximity to the surface 712 of the outer shell 702 that is adjacent one or more surfaces of another device that generates heat. The liquid in the evaporator section 704a evaporates into a vapor due to the heat, and the vapor rises through the evaporator region 708.

As also shown in FIG. 7, the vapor chamber 700 may include a condenser region 710, and the porous wicking structure 704 may include the condenser section 704b in proximity to the surface of the outer shell 702 that is adjacent the cooling fins 706. The heated vapor rises to the condenser region 710 into the condenser section 704b and dissipates the heat into the surface of the outer shell 702 adjacent the cooling fins 706. The cooling fins 706 further dissipate the heat from the outer shell 702 into the surrounding environment.

As shown in FIG. 7, after dissipating the heat in the condenser section 704b and the outer shell 702, the vapor condenses into the liquid within the condenser section 704*b*. The porous wicking structure 704 then wicks the newly condensed liquid around the outer edges of the outer shell through the wicking sections 704*c*-704*h* of the porous wicking structure 704 back to the evaporator region 708, where the heat evaporates the liquid into a vapor and the cycle is repeated. Via this process, the vapor chamber 700 removes heat from the surface of the other device to facilitate the maintenance of an operating temperature for the other device.

As will be appreciated by one of ordinary skill in the art in view of this disclosure, the number and arrangement of components shown in FIG. 7 are provided as examples. In practice, the vapor chamber 700 of FIG. 7 may include additional components, fewer components, different components, or differently arranged components than those shown in FIG. 7.

In some embodiments, the method for manufacturing the vapor chamber 700 may include determining actual thicknesses of one or more of the shell sections 702*a*-702*h*. For example, the method may include capturing one or more images of one or more of the shell sections 702*a*-702*h* and analyzing the one or more images to determine the actual thicknesses of one or more of the shell sections 702*a*-702*h*. For example, the method may include using image-based measuring techniques to analyze the one or more images to determine the actual thicknesses of one or more of the shell sections 702*a*-702*h*. As another example, the method may include analyzing the one or more images using one or more machine learning models to determine the actual thicknesses of one or more of the shell sections 702*a*-702*h*.

In some embodiments, the method for manufacturing the vapor chamber 700 may include determining, using one or more machine learning models and based on the actual thicknesses of one or more of the shell sections 702*a*-702*h*, optimized thicknesses for one or more of the wicking sections 704*a*-704*h* of the porous wicking structure 704. The one or more machine learning models may be trained to determine optimized thicknesses for wicking sections of porous wicking structures that achieve optimal performance of vapor chambers, such as thermal performance, heat dissipation capabilities, reliability, durability, and/or the like. For example, the one or more machine learning models may be trained using historical data associated with previously manufactured vapor chambers that include outer shells and porous wicking structures. The historical data may include actual values of thicknesses of shell sections of outer shells and actual thicknesses of wicking sections of porous wicking structures of previously manufactured vapor chambers, simulation inputs, analytical inputs, and/or historical performance data of the previously manufactured vapor chambers (e.g., thermal performance metrics, heat dissipation metrics, reliability metrics, durability metrics, and/or the like) such that the machine learning models provide optimized thicknesses for wicking sections of porous wicking structures that achieve optimal performance of vapor chambers. By using machine learning models to determine optimized thicknesses for wicking sections based on actual thicknesses of shell sections, the method improves the performance of the vapor chamber as compared to vapor chambers made via manufacturing processes that do not use machine learning models and do not account for actual thicknesses of shell sections.

In some embodiments, the method for manufacturing the vapor chamber 700 may further include determining an amount-by-weight of powder to dispose in each shell section to achieve the optimized thicknesses for wicking sections of the porous wicking structure 704. For example, the optimized thickness for the condenser section 704*b* of the porous wicking structure 704 may be greater than the optimized thickness for the evaporator section 704*a*. In such an example, the method may include determining that a greater amount-by-weight of powder should be disposed in the outer shell 702 to form the condenser section 704*b* than an amount-by-weight of powder to be disposed in the outer shell 702 to form the evaporator section 704*a*.

In some embodiments, the method for manufacturing the vapor chamber 700 may include disposing the determined amounts-by-weight of powder to each of the shell sections 702*a*-702*h* to achieve the optimized thicknesses for each of the wicking sections 704*a*-704*h*. In this way, the method may achieve a porous wicking structure 704 having a thickness in each of the wicking sections 704*a*-704*h* such that the vapor chamber 700 provides optimal performance for removing heat from the surface of the other device.

As will be appreciated by one of ordinary skill in the art in view of the present disclosure, the method of manufacturing the vapor chamber 700 may include additional steps, alternative steps, and/or the like. For example, the method may include determining, using one or more machine learning models, an optimized thickness for one or more of the shell sections 702*a*-702*h* of the outer shell 702 to achieve optimal performance of the vapor chamber 700. In such an example, the one or more machine learning models may be trained using historical data associated with previously manufactured vapor chambers that include outer shells such that the machine learning models provide optimized thicknesses for shell sections of outer shells that achieve optimal performance of vapor chambers.

FIG. 8 illustrates another example of a method 800 for manufacturing an object, in accordance with an embodiment of the invention. In some embodiments, one or more manufacturing systems, one or more measuring systems, one or more artificial-intelligence-based manufacturing platforms, and/or the like may perform one or more of the steps of the method 800. The object may include a plurality of components. For example, the object may be the electronic device 600 as shown and described herein with respect to FIG. 6, and the components may include circuit boards, processors, heatsinks, sections of thermal interface material, and/or the like, such as those shown and described herein with respect to FIG. 6. As another example, the object may be the vapor chamber 700 as shown and described herein with respect to FIG. 7, and the components may include outer shells, shell sections, porous wicking structures, wicking sections, cooling fins, surfaces, and/or the like, such as those shown and described herein with respect to FIG. 7. As shown in FIG. 8, the method 800 includes steps shown in blocks 802-810. Although only the steps in blocks 802-810 are shown in FIG. 8, the method 800 may include additional steps.

As shown in block 802, the method 800 may include determining a first actual value of a first attribute of a first component of an object. In some embodiments, the first component may be manufactured to have a particular value of the first attribute within a manufacturing tolerance. For example, within the context of FIG. 6, the first component may be a processor positioned on a circuit board, the first attribute may be a geometric configuration of the surface of the processor that will interface with the pedestal of a heatsink, and the method may include determining the actual geometric configuration of the surface of the processor. As another example, within the context of FIG. 7, the first component may be a shell section of an outer shell of a vapor chamber, the first attribute may be a thickness of the shell section, and the method may include determining the actual thickness of the shell section.

As shown in block 804, the method 800 may include determining a second actual value of a second attribute of a second component of the object. In some embodiments, the second component may be manufactured to have a particular value of the second attribute within a manufacturing tolerance. For example, within the context of FIG. 6, the second component may be a heatsink including a pedestal, the first attribute may be a geometric configuration of a surface of the pedestal that will interface with the processor, and the method may include determining the actual geometric configuration of the surface of the pedestal. As another example, within the context of FIG. 7, the second component may be another shell section of the outer shells of the vapor chamber, the first attribute may be a thickness of the other shell section, and the method may include determining the actual thickness of the other shell section.

In some embodiments, the method 800 may include capturing one or more images of the first component and/or the second component and analyzing the one or more images to determine the actual value of the first attribute of the first component and/or the actual value of the second attribute of the second component. For example, the method 800 may include using image-based measuring techniques to analyze the one or more images to determine the actual value of the first attribute of the first component and/or the actual value of the second attribute of the second component. As another example, the method 800 may include analyzing the one or more images using one or more machine learning models to determine the actual value of the first attribute of the first component and/or the actual value of the second attribute of the second component.

In some embodiments, the method 800 may include analyzing data from a manufacturer of the first component and/or the second component to determine the actual value of the first attribute and/or the actual value of the second attribute. For example, the manufacturer of the first component and/or the second component may provide technical data (e.g., a specification document, a table of measurement data, and/or the like) including actual values of attributes of the first component and/or the second component as determined and/or measured by the manufacturer after manufacturing the first component and/or the second component.

As shown in block 806, the method 800 may include determining, using a machine learning model and based on the first actual value of the first attribute and the second actual value of the second attribute, an optimized value for a third attribute of a third component that is functionally interrelated to the first component and the second component of the object. In some embodiments, the third component may be manufactured to have a particular value of the third attribute within a manufacturing tolerance.

For example, within the context of FIG. 6, the third component may be a section of thermal interface material to be positioned between the processor and the pedestal of the heatsink and the third attribute may be a geometry of the section of thermal interface material. In such an example, the method 800 may include determining an optimized geometry of the section of thermal interface material using the machine learning model based on the actual geometric configuration of the surface of the processor and the actual geometric configuration of the surface of the pedestal.

As another example, within the context of FIG. 7, the third component may be a one or more wicking sections of a porous wicking structure of the vapor chamber and the third attribute may be thicknesses of the one or more wicking sections. In such an example, the method 800 may include determining optimized thicknesses of the one or more wicking sections using the machine learning model based on the actual thicknesses of the shell sections.

In some embodiments, the machine learning model may be trained using one or more reinforcement learning techniques. Additionally, or alternatively, the machine learning model may determine optimized values of attributes of components of objects by running a plurality of simulations. For example, the machine learning model may determine the optimized value of the third attribute of the third component by running a plurality of simulations using the actual value of the first attribute of the first component, the actual value of the second attribute of the second component, and the tolerance range for the third attribute of the plurality of third components.

In some embodiments, the method 800 may include training the machine learning model to determine optimized values of attributes of components of objects (e.g., to obtain optimal performance of the objects) using historical data. For example, the historical data may include (i) historical actual values of first attributes of first components of historical objects, (ii) historical actual values of second attributes of second components of the historical objects, (iii) historical actual values of third attributes of third components of the historical objects, and/or (iv) historical test results obtained by testing the historical objects. By training the machine learning model on such historical data, the machine learning model may be configured to determine and/or predict optimized values of attributes of components of objects such that the objects manufactured with components having attributes with the optimized values perform better when tested.

As shown in block 808, the method 800 may include selecting, from a plurality of third components each having a value for the third attribute within a tolerance range, the third component having the optimized value for the third attribute. For example, within the context of FIG. 6, the method 800 may include, selecting, from a plurality of sections of thermal interface material, a section of thermal interface material having the optimized geometry determined using the machine learning model based on the actual geometric configuration of the surface of the processor and the actual geometric configuration of the surface of the pedestal. As another example, within the context of FIG. 7, the method 800 may include selecting, from a plurality of possible thicknesses of the porous wicking structure, the optimized thicknesses for the one or more wicking sections determined using the machine learning model based on the actual thicknesses of the shell sections.

As shown in block 810, the method 800 may include manufacturing the object using the first component, the second component, and the selected third component. For example, within the context of FIG. 6, the method 800 may include disposing the selected section of thermal interface material having the optimized geometry on the processor positioned on the circuit board and disposing the heatsink with respect to the processor such that the pedestal is positioned on the section of the thermal interface material. As another example, within the context of FIG. 7, the method 800 may include disposing amounts-by-weight of powder to corresponding sections of the outer shell to achieve the selected optimized thicknesses of the wicking sections of the porous wicking structure.

Method 800 may include additional embodiments, such as any single embodiment or any combination of embodiments described herein. Although FIG. 8 shows example blocks of method 800, in some embodiments, method 800 may include additional blocks, fewer blocks, different blocks, or differently arranged blocks than those depicted in FIG. 8. Additionally, or alternatively, two or more of the blocks of method 800 may be performed in parallel.

FIG. 9 illustrates another example of a method for manufacturing an electronic device 900, in accordance with an embodiment of the invention. As shown in FIG. 9, the electronic device 900 may include a heatsink 902, a section of thermal interface material 904, and a protective film 906. As shown in the inset 910 of FIG. 9, the protective film 906 may be adhered to a side of the section of thermal interface material 904 opposite the side intended to be adhered to the heatsink.

In some embodiments, the method of manufacturing the electronic device 900 may include performing a series of steps, where one or more of the steps is intended to achieve a target outcome. For example, the series of steps may include a first step of positioning a processor on a circuit board, where the target outcome is positioning the processor at a particular location on the circuit board. A second step may include applying the section of thermal interface material 904 on the heatsink 902, where the target outcome is alignment of the section of thermal interface material 904 with a pedestal of the heatsink 902.

As shown in FIG. 9, the side of the section of thermal interface material 904 that is not adhered to the protective film 906 may be applied to the heatsink 902. The series of steps may include a third step of removing the protective film 906 from the section of thermal interface material 904, where the target outcome is complete removal of the protective film 906 from the section of thermal interface material 904. A fourth step may include positioning the heatsink 902 with the section of thermal interface material 904 on the processor on the circuit board. If the protective film 906 is not completely removed from the section of thermal interface material 904 and the heatsink 902 is positioned on the processor, the protective film 906 will prevent the heatsink 902 from removing heat from the processor, thereby reducing the thermal performance of the electronic device 900 and potentially causing the processor to overheat and fail.

To prevent such degradation of the performance of the electronic device 900, in some embodiments, the method of manufacturing the electronic device 900 may include, before performing the step of positioning the heatsink 902 with the section of thermal interface material 904 on the processor, capturing one or more images of the heatsink 902 and the section of thermal interface material 904. The method may further include providing the one or more images to one or more machine learning models to determine whether the protective film 906 was completely removed from the thermal interface material 904. For example, the protective film 906 may include one or more markings, and the one or more machine learning models may be configured to determine whether the protective film 906 was completely removed from the thermal interface material 904 by determining whether the one or more images include the one or more markings.

In some embodiments, the method may include, in response to determining that the protective film 906 was not completely removed from the thermal interface material 904, stopping performance of the series of steps for manufacturing the electronic device 900. Additionally, or alternatively, the method may include, in response to determining that the protective film 906 was not completely removed from the thermal interface material 904, generating a notification, an alert, and/or the like to communicate to a manufacturing system, a user device, a user, and/or the like that the protective film 906 was not completely removed from the thermal interface material 904. By interrupting performance of the series of steps for manufacturing the electronic device 900, the method may prevent the electronic device 900 from being manufactured with the protective film 906 between the thermal interface material 904 and the processor.

In some embodiments, the method may include, in response to determining that the protective film 906 was completely removed from the thermal interface material 904, positioning the heatsink 902 with the section of thermal interface material 904 on the processor on the circuit board. The method may further include performing the remaining steps in the series of steps for manufacturing the electronic device 900.

As will be appreciated by one of ordinary skill in the art in view of the present disclosure, the method of manufacturing the electronic device 900 may include additional steps, alternative steps, and/or the like. For example, the method may include analyzing the one or more images of the heatsink 902 and the section of thermal interface material 904 using one or more machine learning models to determine whether the section of thermal interface material 904 is properly aligned on the heatsink 902 and interrupting and/or stopping performance of subsequent steps.

FIG. 10 illustrates another example of a method 1000 for manufacturing an object, in accordance with an embodiment of the invention. In some embodiments, one or more manufacturing systems, one or more measuring systems, one or more artificial-intelligence-based manufacturing platforms, and/or the like may perform one or more of the steps of the method 500. The object may include a plurality of components. For example, the object may be the electronic device 900 as shown and described herein with respect to FIG. 9.

As shown in block 1002, the method 1000 may include performing a respective step in a series of steps for manufacturing an object to achieve a target outcome of the respective step. For example, within the context of FIG. 9, the method 1000 may include performing the step of removing the protective film 906 from the section of thermal interface material 904, and the target outcome may be complete removal of the protective film 906 from the section of thermal interface material 904.

As shown in block 1004, the method 1000 may include, after performing the respective step, capturing one or more images of an actual outcome of the respective step. Continuing with the example of FIG. 9, the method 1000 may include capturing one or more images of the heatsink 902 and the section of thermal interface material 904.

As shown in block 1006, the method 1000 may include providing the one or more images to one or more machine learning models to determine whether the actual outcome of the respective step corresponds to the target outcome of the respective step. For example, within the context of FIG. 9, the method 1000 may include providing the one or more images of the heatsink 902 and the section of thermal interface material 904 to one or more machine learning models to determine whether the protective film 906 was completely removed from the thermal interface material 904.

In some embodiments, the one or more machine learning models may be trained using one or more reinforcement learning techniques. In some embodiments, the method 1000 may include training the one or more machine learning models to determine whether actual outcomes of steps correspond to target outcomes of steps using historical image data. For example, the historical image data may include (i) historical images of target outcomes tagged as target outcomes and (ii) historical images of other outcomes that do not correspond to target outcomes and are tagged as not being target outcomes. By training the one or more machine learning models on such historical data, the one or more machine learning models may be configured to determine, based on images of actual outcomes, whether the actual outcomes correspond to the target outcomes of steps.

As shown in block 1008, the method 1000 may include determining if the actual outcome of the respective step corresponds to the target outcome of the respective step. For example, the method 1000 may include determining if the actual outcome of the respective step corresponds to the target outcome of the respective step based on data output from the one or more machine learning models.

As shown in block 1010, the method 1000 may include, if the actual outcome of the respective step does not correspond to the target outcome of the respective step, stopping performance of the series of steps and generating a notification. For example, the method 1000 may include preventing performance of subsequent step in the series of steps and a generating a notification, an alert, and/or the like to communicate to a manufacturing system, a user device, a user, and/or the like that the actual outcome of the respective step does not correspond to the target outcome of the respective step. Within the context of FIG. 9, the method 1000 may include stopping performance of the step of positioning the heatsink 902 with the section of thermal interface material 904 on the processor.

As shown in block 1012, the method 1000 may include, if the actual outcome of the respective step corresponds to the target outcome of the respective step, initiating performance of a subsequent step in the series of steps. For example, within the context of FIG. 9, the method 1000 may include positioning the heatsink 902 with the section of thermal interface material 904 on the processor.

Method 1000 may include additional embodiments, such as any single embodiment or any combination of embodiments described herein. Although FIG. 10 shows example blocks of method 1000, in some embodiments, method 1000 may include additional blocks, fewer blocks, different blocks, or differently arranged blocks than those depicted in FIG. 10. Additionally, or alternatively, two or more of the blocks of method 1000 may be performed in parallel.

FIG. 11 illustrates a system environment 1100 for artificial-intelligence-based manufacturing, in accordance with an embodiment of the invention. As shown in FIG. 11, the system environment 1100 may include a manufacturing system 1110 (e.g., one or more systems and/or devices for manufacturing objects and/or the like), a measuring system 1115 (e.g., one or more systems and/or devices for measuring attributes, one or more systems and/or devices for testing objects to obtain test results, and/or the like), a network 1120, a data structure 1130, an artificial-intelligence-based (AI-based) manufacturing platform 1140, and a cloud computing environment 1150 with computing resources 1155. Devices of environment 1100 may interconnect via wired connections, wireless connections, or a combination of wired and wireless connections. Devices of environment 1100 may perform one or more of the steps of one or more of the methods described herein (e.g., with respect to FIGS. 1A-1C, 2, 3, 4A-4C, and 5-10).

In some embodiments, the manufacturing system 1110 may include one or more devices capable of receiving instructions for and/or executing such instructions to manufacture objects. For example, the manufacturing system 1110 may include one or more tools for manufacturing one or more objects, such as electronic devices, vapor chambers, heat pipes, semiconductor-based devices, silicon-based devices, products, and/or any other object manufactured via a process.

In some embodiments, the measuring system 1115 may include one or more devices capable of determining actual values of attributes of objects, actual values of attributes of components of objects, actual values of attributes of intermediate components of objects during manufacturing, and/or the like. For example, the measuring system 1115 may include one or more devices for determining dimensions (e.g., heights, widths, lengths, volumes, radii, diameters, circumferences, perimeters, areas, weights, and/or the like), properties, characteristics, qualities, traits, features, conditions, and/or the like of objects, components of objects, intermediate components of objects during manufacturing, and/or the like. In some embodiments, the measuring system 1115 may include one or more cameras, one or more images sensors, one or more machine vision systems, and/or the like for capturing images of objects, components of objects, intermediate components of objects during manufacturing, and/or the like. Additionally, or alternatively, the measuring system 1115 may use one or more machine learning models to determine actual values of attributes based on the one or more images.

The network 1120 may include one or more wired and/or wireless networks. For example, the network 1120 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The data structure 1130 may include any type of data structure (e.g., a database, an array, a linked list, a record, a hash table, and/or the like) for storing data. In some embodiments, the data structure 1130 may be maintained on-site with the manufacturing system 1110 and/or the measuring system 1115. Additionally, or alternatively, the data structure 1130 may be cloud-based and may be stored remotely from the manufacturing system 1110 and/or the measuring system 1115.

In some embodiments, the AI-based manufacturing platform 1140 may include one or more computing resources assigned to determine optimized values of attributes of components and/or the like, as described herein (e.g., with respect to FIGS. 1A-1C, 2, 3, 4A-4C, and 5-10). For example, the AI-based manufacturing platform 1140 may be a platform implemented by the cloud computing environment 1150 that may receive actual values (e.g., measured values) of attributes, train machine learning models, determine optimized values for subsequent manufacturing steps, access and/or store data in the data structure 1130, and/or the like. In some embodiments, the AI-based manufacturing platform 1140 may be implemented by computing resources 1155 of the cloud computing environment 1150.

The AI-based manufacturing platform 1140 may include a server device or a group of server devices. In some embodiments, AI-based manufacturing platform 1140 may be hosted in cloud computing environment 1150. Notably, while embodiments described herein describe the AI-based manufacturing platform 1140 as being hosted in cloud computing environment 1150, in some embodiments, the AI-based manufacturing platform 1140 may be non-cloud-based or may be partially cloud-based.

The cloud computing environment 1150 may include an environment that delivers computing as a service, whereby shared resources, services, etc. may be provided to other devices, such as the manufacturing system 1110, the measuring system 1115, and/or the like. The cloud computing environment 1150 may provide computation, software, data access, storage, and/or other services that do not require end-user knowledge of a physical location and configuration of a system and/or a device that delivers the services. As shown, the cloud computing environment 150 may include the AI-based manufacturing platform 1140 and the computing resource 1155.

The computing resource 1155 may include one or more personal computers, workstation computers, server devices, or another type of computation and/or communication device. In some embodiments, the computing resource 1155 may host the AI-based manufacturing platform 1140. The cloud resources may include compute instances executing in the computing resource 1155, storage devices provided in the computing resource 1155, data transfer devices provided by the computing resource 1155, etc. In some embodiments, the computing resource 1155 may communicate with other computing resources 1155 via wired connections, wireless connections, or a combination of wired and wireless connections.

As further shown in FIG. 11, the computing resource 1155 may include a group of cloud resources, such as one or more applications ("APPs") 1155-1, one or more virtual machines ("VMs") 1155-2, virtualized storage ("VSs") 1155-3, one or more hypervisors ("HYPs") 1155-4, or the like.

The application 1155-1 may include one or more software applications that may be provided to or accessed by devices, such as the manufacturing system 1110 and/or the measuring system 1115. The application 1155-1 may eliminate a need to install and execute the software applications on devices, such as the manufacturing system 1110 and/or the measuring system 1115. For example, the application 1155-1 may include software associated with the AI-based manufacturing platform 1140 and/or any other software capable of being provided via the cloud computing environment 1150. In some embodiments, one application 1155-1 may send and/or receive information to and/or from one or more other applications 1155-1 via virtual machine 1155-2.

The virtual machine 1155-2 may include a software implementation of a machine (e.g., a computer) that executes programs like a physical machine. The virtual machine 1155-2 may be either a system virtual machine or a process virtual machine, depending upon use and degree of correspondence to any real machine by the virtual machine 1155-2. A system virtual machine may provide a complete system platform that supports execution of a complete operating system ("OS"). A process virtual machine may execute a single program and may support a single process. In some embodiments, the virtual machine 1155-2 may execute on behalf of a user (e.g., devices, such as the manufacturing system 1110, the measuring system 1115, the AI-based manufacturing platform 1140, and/or the like) and may manage infrastructure of the cloud computing environment 1150, such as data management, synchronization, or long-duration data transfers.

The virtualized storage 1155-3 may include one or more storage systems and/or one or more devices that use virtualization techniques within the storage systems or devices of the computing resource 1155. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 1155-4 may provide hardware virtualization techniques that allow multiple operating systems (e.g., "guest operating systems") to execute concurrently on a host computer, such as the computing resource 1155. The hypervisor 1155-4 may present a virtual operating platform to the guest operating systems and may manage the execution of the guest operating systems. Multiple instances of a variety of operating systems may share virtualized hardware resources.

The number and arrangement of devices and networks shown in FIG. 11 are provided as one or more examples. In practice, there may be additional devices and/or networks, fewer devices and/or networks, different devices and/or networks, or differently arranged devices and/or networks than those shown in FIG. 11. Furthermore, two or more devices and/or systems shown in FIG. 11 may be implemented within a single device and/or a single system, or a single device and/or a single system shown in FIG. 11 may be implemented as multiple, distributed devices. Additionally or alternatively, a set of devices (e.g., one or more devices) of the environment 1100 may perform one or more functions described as being performed by another set of devices of the environment 1100.

FIG. 12 is a diagram of example components of a device 1200. In some embodiments, the device 1200 may correspond to the manufacturing system, the measuring system, and/or the artificial-intelligence-based manufacturing platform described herein with respect to FIGS. 1A-1C, 2, 3, 4A-4C, and 5-11. Additionally or alternatively, the manufacturing system, the measuring system, and/or the artificial-intelligence-based manufacturing platform described herein with respect to FIGS. 1A-1C, 2, 3, 4A-4C, and 5-11 may include one or more devices 1200 and/or one or more components of the device 1200. As shown in FIG. 12, the device 1200 may include a bus 1210, a processor 1220, a memory 1230, a storage component 1240, an input component 1250, an output component 1260, and a communication interface 1270.

Bus 1210 may include a component that permits communication among multiple components of the device 1200. The processor 1220 may be implemented in hardware, firmware, and/or a combination of hardware and software. The processor 1220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 1220 may include one or more processors capable of being programmed to perform a function. The memory 1230 may include a random access memory (RAM), a read only memory (ROM), and/or another type of dynamic or static storage device (e.g., a flash memory, a magnetic memory, and/or an optical memory) that stores information and/or instructions for use by the processor 1220.

The storage component 1240 may store information and/or software related to the operation and use of the device 1200. For example, the storage component 1240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

The input component 1250 may include a component that permits the device 1200 to receive information, such as via user input (e.g., a touch screen display, a keyboard, a keypad, a mouse, a button, a switch, and/or a microphone). Additionally or alternatively, the input component 1250 may include a component for determining location (e.g., a global positioning system (GPS) component) and/or a sensor (e.g., an accelerometer, a gyroscope, an actuator, another type of positional or environmental sensor, and/or the like). The output component 1260 may include a component that provides output information from the device 1200 (via, e.g., a display, a speaker, a haptic feedback component, an audio or visual indicator, and/or the like).

The communication interface 1270 may include a transceiver-like component (e.g., a transceiver, a separate receiver, a separate transmitter, and/or the like) that enables the device 1200 to communicate with other devices, such as via a wired connection, a wireless connection, or a combination of wired and wireless connections. The communication interface 1270 may permit the device 1200 to receive information from another device and/or provide information to another device. For example, the communication interface 1270 may include an Ethernet interface, an optical interface, a coaxial interface, an infrared interface, a radio frequency (RF) interface, a universal serial bus (USB) interface, a Wi-Fi interface, a cellular network interface, and/or the like.

The device 1200 may perform one or more processes described herein. The device 1200 may perform these processes based on the processor 1220 executing software instructions stored by a non-transitory computer-readable medium, such as the memory 1230 and/or the storage component 1240. As used herein, the term "computer-readable medium" refers to a non-transitory memory device. A memory device includes memory space within a single physical storage device or memory space spread across multiple physical storage devices.

Software instructions may be read into the memory 1230 and/or the storage component 1240 from another computer-readable medium or from another device via the communication interface 1270. When executed, software instructions stored in the memory 1230 and/or the storage component 1240 may cause the processor 1220 to perform one or more processes described herein. Additionally, or alternatively, hardware circuitry may be used in place of or in combination with software instructions to perform one or more processes described herein. Thus, embodiments described herein are not limited to any specific combination of hardware circuitry and software.

The number and arrangement of components shown in FIG. 12 are provided as an example. In practice, the device 1200 may include additional components, fewer components, different components, or differently arranged components than those shown in FIG. 12. Additionally or alternatively, a set of components (e.g., one or more components)

of the device 1200 may perform one or more functions described as being performed by another set of components of the device 1200.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor and/or a processing device, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium and/or a non-transitory storage device, such as a tangible electronic, magnetic, optical, electromagnetic, infrared, and/or semiconductor system, device, and/or other apparatus. For example, in some embodiments, the non-transitory computer-readable medium and/or the non-transitory storage device may include a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

While certain example embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A method of manufacturing an object, the method comprising:

selecting, from a plurality of first components each having a respective value for a respective first attribute within a tolerance range, a first component of an object;

determining an actual value of the first attribute of the first component;

determining, using a machine learning model and based on the actual value of the first attribute, an optimized value for a second attribute of a second component that is functionally interrelated to the first component in the object;

selecting, from a plurality of second components each having a value for the second attribute within another tolerance range, the second component having the optimized value for the second attribute; and manufacturing the object using the first component and the selected second component.

2. The method of claim 1, wherein determining the actual value of the first attribute of the first component comprises:

capturing one or more images of the first component; and analyzing the one or more images to determine the actual value of the first attribute of the first component.

3. The method of claim 2, wherein analyzing the one or more images comprises analyzing, using another machine learning model, the one or more images to determine the actual value of the first attribute of the first component.

4. The method of claim 1, wherein determining the actual value of the first attribute of the first component comprises analyzing data from a manufacturer of the first component.

5. The method of claim 1, further comprising training the machine learning model using historical data comprising (i) historical actual values of first attributes of first components of historical objects, (ii) historical actual values of second attributes of second components of the historical objects, and (iii) historical test results obtained by testing the historical objects.

6. The method of claim 1, further comprising, after manufacturing the object:

performing one or more tests on the object to obtain test results; and retraining the machine learning model using the actual value of the first attribute of the first component, the optimized value of the second attribute of the second component, and the test results.

7. The method of claim 1, wherein:

the first component comprises a circuit board;

the first attribute is a first diameter of a hole in the circuit board;

the second component comprises a pin having a portion configured to be received in the hole via an interference fit; and the second attribute is a second outer diameter of the portion of the pin configured to be received in the hole via the interference fit.

8. The method of claim 1, wherein:

the first component comprises an electronic component positioned on a circuit board;

the first attribute is a position of the electronic component on the circuit board;

the second component comprises an adhesive for securing the electronic component to the circuit board; and the second attribute comprises an amount and a position of the adhesive with respect to the electronic component and the circuit board.

9. The method of claim 1, wherein:

the first component comprises a processor;

the first attribute comprises thermal performance of the processor;

the second component comprises a circuit board; and the second attribute comprises a position on the circuit board for receiving the processor and an orientation of the position on the circuit board with respect to a coolant flow.

10. The method of claim 9, comprising, before manufacturing the object:

determining, using another machine learning model and based on the thermal performance of the processor, the position on the circuit board for receiving the processor, and the orientation of the circuit board with respect to the coolant flow, an optimized thermal performance of a heatsink for cooling the processor on the circuit board; and selecting, from a plurality of heatsinks each having a thermal performance value within a respective tolerance range, the heatsink having the optimized thermal performance.

11. A method of manufacturing an object, the method comprising:

selecting, from a plurality of first components each having a respective value for a respective first attribute within a tolerance range, a first component of an object;

determining a first actual value of the first attribute of the first component;

determining a second actual value of a second attribute of a second component of the object;

determining, using a machine learning model and based on the first actual value of the first attribute and the second actual value of the second attribute, an optimized value for a third attribute of a third component that is functionally interrelated to the first component and the second component of the object;

selecting, from a plurality of third components each having a value for the third attribute within another tolerance range, the third component having the optimized value for the third attribute; and manufacturing the object using the first component, the second component, and the selected third component.

12. The method of claim 11, wherein:

the first component comprises a processor positioned on a circuit board;

the first attribute comprises a first geometry of the processor on the circuit board;

the second component comprises a heatsink for cooling the processor on the circuit board, wherein the heatsink comprises a pedestal for interfacing with the processor;

the second attribute comprises a second geometry of the pedestal of the heatsink;

the third component comprises a section of thermal interface material; and the third attribute comprises a third geometry of the section of the thermal interface material.

13. The method of claim 11, wherein:

the first component comprises a first section of a shell of a vapor chamber;

the first attribute comprises a first geometry of the first section of the shell;

the second component comprises a second section of the shell;

the second attribute comprises a second geometry of the second section of the shell;

the third component comprises a wicking structure on an interior of the shell; and the third attribute comprises a first thickness of the wicking structure in the first section of the shell and a second thickness of the wicking structure in the second section of the shell.

14. The method of claim 13, wherein manufacturing the object comprises:

disposing a first amount-by-weight of powder to the first section of the shell to achieve the first thickness of the wicking structure; and disposing a second amount-by-weight of the powder to the second section of the shell to achieve the second thickness of the wicking structure.

15. The method of claim 11, wherein determining the actual value of the first attribute of the first component comprises:

capturing one or more images of the first component; and analyzing the one or more images to determine the actual value of the first attribute of the first component, wherein analyzing the one or more images comprises analyzing, using another machine learning model, the one or more images to determine the actual value of the first attribute of the first component.

16. The method of claim 11, further comprising training the machine learning model using historical data comprising (i) historical actual values of first attributes of first components of historical objects, (ii) historical actual values of second attributes of second components of the historical objects, (iii) historical actual values of third attributes of third components of the historical objects, and (iv) historical test results obtained by testing the historical objects.

17. A method of manufacturing an object, the method comprising:

performing a respective step in a series of steps for manufacturing an object to achieve a target outcome of the respective step;

after performing the respective step, capturing one or more images of an actual outcome of the respective step;

providing the one or more images to one or more machine learning models to determine whether the actual outcome of the respective step corresponds to the target outcome of the respective step;

in response to the actual outcome not corresponding to the target outcome, stopping performance of the series of steps and generating a notification; and in response to the actual outcome corresponding to the target outcome, initiating performance of a subsequent step in the series of steps.

18. The method of claim 17, wherein the series of steps comprises:

a first step of applying a thermal interface material to a surface of a heatsink, wherein the thermal interface material is adhered to a protective film;

a second step of removing the protective film from the thermal interface material, wherein the second step is performed after the first step is performed; and a third step of disposing a component on the thermal interface material, wherein the third step is performed after the second step is performed;

wherein a machine learning model of the one or more machine learning models is configured to analyze the one or more images to determine whether the protective film was removed from the thermal interface material; and wherein the method further comprises preventing, in response to determining that the protective film was not removed from the thermal interface material, performance of the third step.

* * * * *